(12) United States Patent
Kaneko et al.

(10) Patent No.: US 7,291,211 B2
(45) Date of Patent: Nov. 6, 2007

(54) AQUEOUS INK, INK TANK, INK JET RECORDING APPARATUS, INK JET RECORDING METHOD, AND INK JET RECORDED IMAGE

(75) Inventors: Toshiaki Kaneko, Tokyo (JP); Sadayuki Sugama, Tsukuba (JP); Masashi Miyagawa, Yokohama (JP); Junichi Sakai, Machida (JP); Yoko Ichinose, Tokyo (JP); Yoshio Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/311,641

(22) Filed: Dec. 20, 2005

(65) Prior Publication Data

US 2006/0142417 A1 Jun. 29, 2006

Related U.S. Application Data

(63) Continuation of application No. PCT/JP2005/012157, filed on Jun. 24, 2005.

(30) Foreign Application Priority Data

Jun. 25, 2004 (JP) .............................. 2004-189033
Jun. 28, 2004 (JP) .............................. 2004-190287

(51) Int. Cl.
*C09D 11/02* (2006.01)
(52) U.S. Cl. .................................. 106/31.27; 106/31.6
(58) Field of Classification Search ............. 106/31.27, 106/31.6
See application file for complete search history.

(56) References Cited

U.S. PATENT DOCUMENTS 4,313,124 A 1/1982 Hara ...................... 346/140 R
4,345,262 A 8/1982 Shirato et al. .......... 346/140 R
4,459,600 A 7/1984 Sato et al. .............. 346/140 R
4,463,359 A 7/1984 Ayata et al. ................. 346/1.1
4,558,333 A 12/1985 Sugitani et al. ......... 346/140 R
4,683,002 A 7/1987 Mirua et al. .................. 106/20
4,723,129 A 2/1988 Endo et al. .................. 346/1.1
4,740,796 A 4/1988 Endo et al. .................. 346/1.1
4,977,058 A 12/1990 Miyagawa et al. ......... 430/138
5,952,414 A 9/1999 Noguchi et al. ............. 524/377

(Continued)

FOREIGN PATENT DOCUMENTS

| JP | 59-123670 | 7/1984 |
|---|---|---|
| JP | 8-183920 | 7/1996 |
| JP | 10-195360 | 7/1998 |
| JP | 10-279879 | 10/1998 |
| JP | 3339629 | 8/2002 |
| JP | 3350518 | 9/2002 |
| JP | 2003-34770 | 2/2003 |
| JP | 2003-96358 | 4/2003 |
| JP | 2004-331946 | 11/2004 |

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

An aqueous ink is provided which comprises a dispersible colorant comprising a colorant and chargeable resin pseudo fine particles smaller than the colorant, the colorant and the chargeable resin pseudo fine particles fixing to each other; and at least one of a water-soluble nonionic resin and an emulsion particle. As a result, it becomes possible to provide an aqueous ink suitable for ink jet recording which has high dispersion stability, is excellent in long-term dispersion stability, and is capable of providing an image excellent in fastness such as rubfastness, especially a highly glossy image. Further, there can also be provided an ink tank, an ink jet recording apparatus, an ink jet recording method, and an ink jet recorded image each using such aqueous ink.

15 Claims, 7 Drawing Sheets

U.S. PATENT DOCUMENTS

| | | | |
|---|---|---|---|
| 5,973,025 A * | 10/1999 | Nigam et al. | 523/160 |
| 5,976,233 A | 11/1999 | Osumi et al. | 106/31.86 |
| 6,074,052 A | 6/2000 | Inui et al. | 347/101 |
| 6,200,676 B1 | 3/2001 | Matsubara et al. | 428/341 |
| 6,387,168 B1 | 5/2002 | Koitabashi et al. | 106/31.6 |
| 6,540,329 B1 | 4/2003 | Kaneko et al. | 347/43 |
| 6,866,707 B2 * | 3/2005 | Kato | 106/31.6 |
| 7,008,977 B2 | 3/2006 | Sakai et al. | 523/200 |
| 7,128,779 B2 | 10/2006 | Osumi et al. | 106/31.52 |
| 7,144,449 B2 | 12/2006 | Udagawa et al. | 106/31.15 |
| 2003/0008942 A1 * | 1/2003 | Ninomiya et al. | 523/160 |
| 2003/0055115 A1 * | 3/2003 | Ninomiya et al. | 516/77 |
| 2003/0081092 A1 | 5/2003 | Ishizuka et al. | 347/100 |
| 2003/0149131 A1 * | 8/2003 | Ninomiya et al. | 523/160 |
| 2003/0199613 A1 * | 10/2003 | Ninomiya et al. | 523/160 |
| 2004/0244622 A1 | 12/2004 | Ichinose et al. | 101/491 |
| 2005/0005818 A1 | 1/2005 | Sato et al. | 106/31.27 |
| 2005/0043434 A1 | 2/2005 | Ichinose et al. | 523/160 |
| 2005/0088501 A1 | 4/2005 | Nagashima et al. | 347/100 |
| 2006/0007288 A1 | 1/2006 | Takada et al. | 347/100 |
| 2006/0009544 A1 | 1/2006 | Miyagawa et al. | 523/160 |
| 2006/0012657 A1 | 1/2006 | Nagashima et al. | 347/100 |
| 2006/0096498 A1 | 5/2006 | Tsujimura et al. | 106/31.27 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0124032 A1 | 6/2006 | Ichinose et al. | 106/400 |
| 2006/0125896 A1 | 6/2006 | Aikawa et al. | 347/100 |
| 2006/0130706 A1 | 6/2006 | Nakajima et al. | 106/499 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142416 A1 | 6/2006 | Sakai et al. | 523/160 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/31.43 |

* cited by examiner

FIG. 2A  DISPERSION OF COLORANT
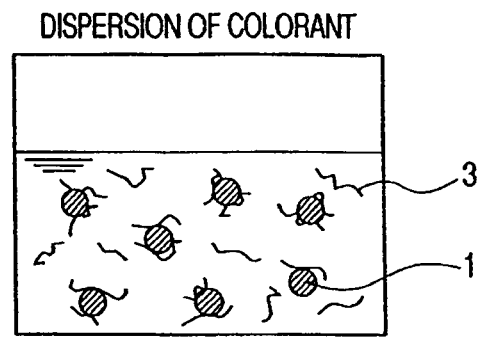
FIG. 2B  DROPWISE ADDITION OF INITIATOR/MONOMER, START OF POLYMERIZATION
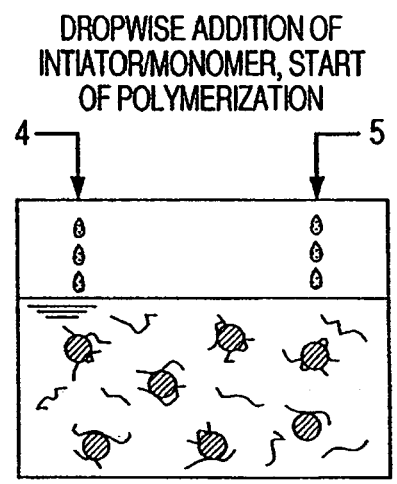
FIG. 2C  FORMATION OF DISPERSIBLE COLORANT
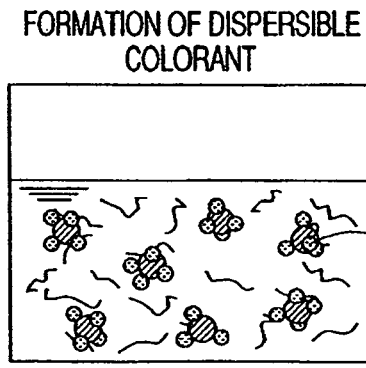
FIG. 2D  PURIFICATION/PRODUCT RECOVERY
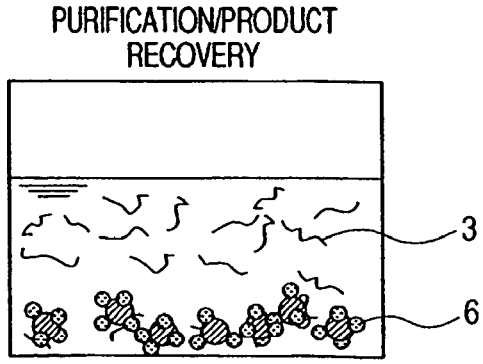

AQUEOUS INK, INK TANK, INK JET RECORDING APPARATUS, INK JET RECORDING METHOD, AND INK JET RECORDED IMAGE

This application is a continuation of International Application No. PCT/JP2005/012157 filed Jun. 24, 2005, which claims the benefit of Japanese Patent Application No. 2004-189033 filed Jun. 25, 2004 and Japanese Patent Application No. 2004-190287 filed Jun. 28, 2004.

BACKGROUND OF THE INVENTION

1. Field of the Invention

The present invention relates to an aqueous ink using a dispersible colorant and a water-soluble nonionic resin and/or an emulsion particle, an ink jet recording apparatus, an ink jet recording method, and an inkjet recorded image.

2. Related Background Art

The ink jet recording system adopts various working principles to produce images, letters or the like by ejecting fine ink droplets from nozzles onto a recording medium (paper or the like). It has been rapidly spreading in various uses because of their advantages of high speed, low noise, capacity of easily producing multi-color images, high flexibility of recorded patterns, and unnecessity of development/fixation. In particular, the full-color aqueous ink jet recording system techniques have recently made remarkable progress, and can now produce multi-color images which are by no means inferior to those by the conventional printing method or photography. It has been widely applied to the full-color image recording area, because of its capacity of producing printed matter at a lower cost than the conventional printing method or photography, when the number of copies is limited.

The ink jet recording apparatus and recording method using an aqueous ink have been improved to satisfy the requirements for improved recording characteristics, such as higher speed, finer images and full-color images. In general, the aqueous ink used for an ink jet recording apparatus is required to have the following performances; (1) even images of high resolution and high density can be obtained without occurrence of bleeding or fogging on paper, (2) the ink is ejected without being dried at the nozzle tips to prevent clogging there while keeping good ejection response and ejection stability, (3) the ink can be well fixed on paper, (4) the images have good weatherfastness, and (5) the images are stable for a long period of time. Especially, an ink that is dried and fixed rapidly and provides printing of high image-quality is being required with a recent increase in printing speed.

Colorants for use in the ink jet recording with an aqueous ink mainly include a dye and a pigment. Water-soluble dyes have hitherto been mainly used because of their handleability as aqueous inks and good color developability. More recently, however, essentially water-insoluble colorants, particularly pigments, have been extensively developed as colorants for aqueous inks for ink jet recording which can realize higher weatherfastness of produced images. For allowing a water-insoluble colorant, particularly pigment, to be used for aqueous inks for ink jet printing, it becomes necessary to stably disperse the colorant in water.

In this case, high dispersion stability has been generally achieved with the aid of a surfactant or polymeric dispersant (hereinafter, also referred to as dispersing resin). Further, another method has been proposed which chemically modifies the surface of a water-insoluble colorant (e.g., Japanese Patent Application Laid-Open No. H10-195360). On the other hand, a microcapsule type pigment having a pigment coated with a resin has also been proposed (e.g., Japanese Patent Application Laid-Open Nos. H08-183920 and 2003-34770). Especially, Japanese Patent Application Laid-Open No. 2003-34770 discloses an aqueous colored fine-particle dispersion comprising a water-insoluble coloring agent which is prepared by dispersing a water-insoluble coloring agent in an aqueous medium in the presence of a dispersant and then adding a vinyl monomer and polymerizing it, and which shows dispersion stability when dispersing the water-insoluble coloring agent, while the stability of the resultant latex is poor when polymerizing the vinyl monomer in the presence of only the dispersant, and describes "when emulsion-polymerized into the water-insoluble coloring agent dispersion, because the affinity of the dispersant with the vinyl monomer and resulting polymer is not so high with the result that the dispersant is difficult to be desorbed from the pigment particle surfaces and the polymerization proceeds on the dispersant-adsorbed pigment particle surfaces, the pigment-surface-coated, fine-particle dispersion can be obtained with a high yield without causing agglomeration, and further describes that by using the colored fine-particle dispersion, an aqueous ink is obtained, which is excellent in dispersion stability and printing characteristics, shows little metallic gloss, has no dependency on the paper type, and gives an image excellent in waterfastness, lightfastness and rubfastness.

However, there have been cases where these techniques do not provide dispersion stability of a colorant and gross of a recorded image sufficiently. The present inventors have made extensive study and considered that in order to improve the dispersion stability, it is necessary to increase the density of functional groups on the surface of a colorant. However, in the conventional technique using a polymeric dispersant and the technique disclosed by Japanese Patent Application Laid-Open No. H08-183920 using a resin-coated pigment, there were cases where when the acid value of a resin was increased in order to improve the dispersion stability, the hydrophilicity of the resin also increased and the resin became liable to be separated from the colorant with the elapse of time, so that the storage stability could not be maintained for a long period of time. On the other hand, with the technique of chemically modifying the surface of a water-insoluble colorant as disclosed by Japanese Patent Application Laid-Open No. H10-195360, there have been posed the problems that the modifiable functional groups and the density thereof are limited, and that effecting direct chemical modification, particularly when the colorant is an organic pigment, will cause the so-called "pigment exfoliation" in which pigment molecules, which are originally water-insoluble and crystallized, become water-soluble through bonding of hydrophilic groups to be dissolved out from pigment particles, thereby significantly change the hue (see FIGS. 6A and 6B). Therefore, these conventional techniques are not fully developed to sufficiently satisfy the recent requirements.

SUMMARY OF THE INVENTION

The present invention has been made in view of solving the problems of the conventional techniques.

It is, therefore, an object of the present invention to provide an aqueous ink comprising a dispersible colorant having sufficiently high dispersion stability and showing no release of a resin component from a colorant, the aqueous ink being capable of recording a high quality glossy image.

It is another object of the present invention to provide an ink tank, an ink jet recording apparatus, an ink jet recording method, and an ink jet recorded image each using such aqueous ink.

In this regard, the present inventors have made extensive studies about a method of achieving the above objects. As a result, they have achieved the development of a novel dispersible colorant having a novel shape, the dispersible colorant maintaining high dispersion stability, and the dispersible colorant having long-term storage stability without causing release of a resin component from a colorant. In addition, they have used such dispersible colorant and incorporated at least one of a water-soluble nonionic resin and emulsion particles to produce aqueous ink having ejection stability and dispersion stability sufficient for ink jet recording applications and providing a printed matter highly excellent in image quality. The objects of the present invention are achieved by such specific means as described below.

That is, according to one aspect of the present invention, there is provided an aqueous ink comprising a dispersible colorant comprising a colorant and a chargeable resin pseudo fine particle smaller than the colorant, the colorant and the chargeable resin pseudo fine particle fixing to each other; and at least one of a water-soluble nonionic resin and an emulsion particle.

According to another aspect of the present invention, there is provided an ink tank containing the above-mentioned aqueous ink.

According to still another aspect of the present invention, there is provided an ink jet recording apparatus for forming an ink jet recorded image using the above-mentioned aqueous ink.

According to yet another aspect of the present invention, there is provided an ink jet recording method comprising forming an image with an ink jet recording apparatus using the above-mentioned aqueous ink.

According to yet still another aspect of the present invention, there is provided an ink jet recorded image formed by an ink jet recording apparatus using the above-mentioned aqueous ink.

According to the present invention, there is provided an aqueous ink excellent in glossiness of an image recorded on a glossy recording medium and in dispersion stability. As another effect of the present invention, there are provided an ink tank, an ink jet recording apparatus, an ink jet recording method, and an ink jet recorded image each using the aqueous ink providing an image excellent in glossiness.

BRIEF DESCRIPTION OF THE DRAWINGS

FIGS. 2A, 2B, 2C, and 2D are schematic views showing representative steps of a production method of the present invention;

Figure 1A:
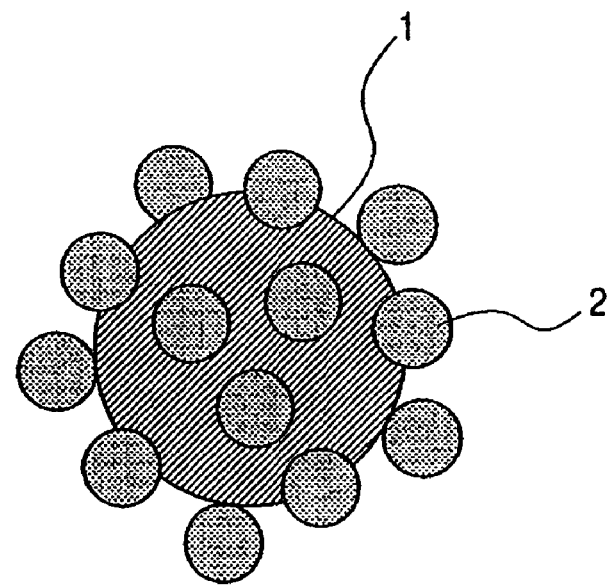
FIGS. 1A and 1B are schematic views each showing the basic structure of a dispersible colorant having flat chargeable resin pseudo fine particles fused thereto in accordance with the present invention.

In the figures, reference numeral 1 denotes a colorant; 1*a*, a colorant molecule; 2, a chargeable resin pseudo fine particle; 3, a dispersible resin; 4, a monomer; 5, an aqueous solution of a polymerization initiator; 6, a dispersible colorant; 7, an oligomer formed as a result of polymerization of monomers; 8, a precipitate obtained as a result of insolubilization of an oligomer in water; 9-1, a hydrophilic monomer unit portion of a flat chargeable resin pseudo fine particle; 9-2, a hydrophobic monomer unit portion of a flat chargeable resin pseudo fine particle; 10, a binding site with a colorant; 11, a flat chargeable resin pseudo fine particle; 12, a hydrophilic group with which a colorant is directly modified; 13, a colorant molecule made hydrophilic; 14, a recording medium; 15-1, a water-soluble nonionic resin; 15-2, a film formed by a water-soluble nonionic resin; 16-1, a particulate emulsion; 16-2, an emulsion in which a particle is collapsed; 16-3, an emulsion provided with fluidity; and 16-4, a film formed by an emulsion.

DESCRIPTION OF THE PREFERRED EMBODIMENTS

The present invention will be explained in detail by way of preferred embodiments of the present invention.

The term "dispersible colorant" herein employed means a colorant, which can be dispersed into water or an aqueous ink medium essentially without requiring addition of a surfactant or polymer dispersant, that is, a colorant having self-dispersibility.

The dispersible colorant to be used in an ink in accordance with the present invention is composed of a colorant and a chargeable resin pseudo fine particle which is smaller in size than the colorant, and is characterized in that the chargeable resin pseudo fine particle is fixed to the colorant. In particular, it is preferable that the chargeable resin pseudo fine particle is present in plurality scatteringly and fixed to the colorant.

Figure 1B:
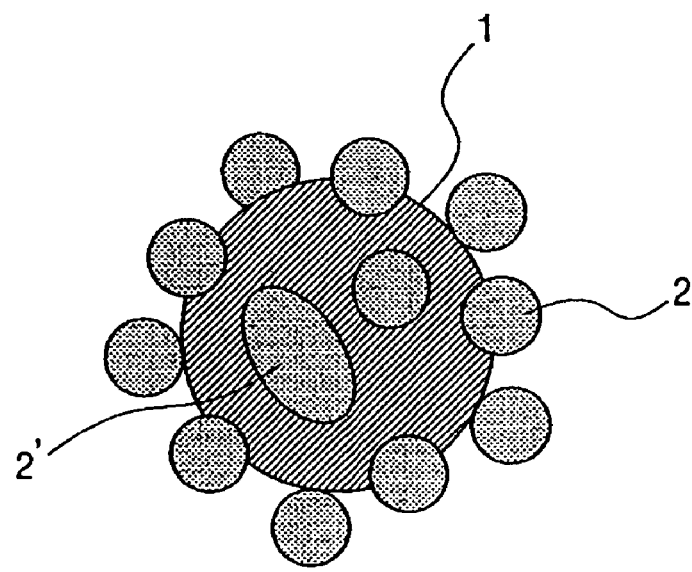

A first feature of a dispersible colorant to be used in the present invention lies in that the dispersible colorant is composed of a colorant and a chargeable resin pseudo fine particle, and the chargeable resin pseudo fine particle fixes to the colorant. FIGS. 1A and 1B are schematic views each showing a dispersible colorant in which chargeable resin pseudo fine particles 2 fix to a colorant 1, the figures characterizing the present invention. A portion denoted by 2' in FIG. 1B is a portion schematically showing a state in which a part of the chargeable resin pseudo fine particles 2 fixing to the surface of the colorant 1 is fused.

The chargeable resin pseudo fine particles fix to the colorant, whereby an electric charge is imparted by the chargeable resin pseudo fine particles to the surface of the colorant to make the dispersible colorant dispersible into water or an aqueous ink medium. At the same time, the dispersible colorant has excellent adhesiveness to a recording medium because of the presence of a resin component fixing to the surface. At this time, the resin component is not merely physically adsorbed but is in a state in which the chargeable resin pseudo fine particles fix to the colorant, which is characteristic of the dispersible colorant to be used in the present invention. Therefore, the chargeable resin pseudo fine particles are not released from the surface of the colorant, and hence the dispersible colorant to be used in the present invention is also excellent in long-term storage stability.

The term "chargeable resin pseudo fine particles" as herein employed refers to a resin aggregate in which resin components strongly agglomerate, or preferably a resin aggregate in which a large number of physical cross-linkings are formed (the term "resin aggregate" refers to a state in which a resin component has a fine particle form or a stable form as a fine agglomerate close to the fine particle form). Details about the chargeable resin pseudo fine particles will be described later.

Figure 4:
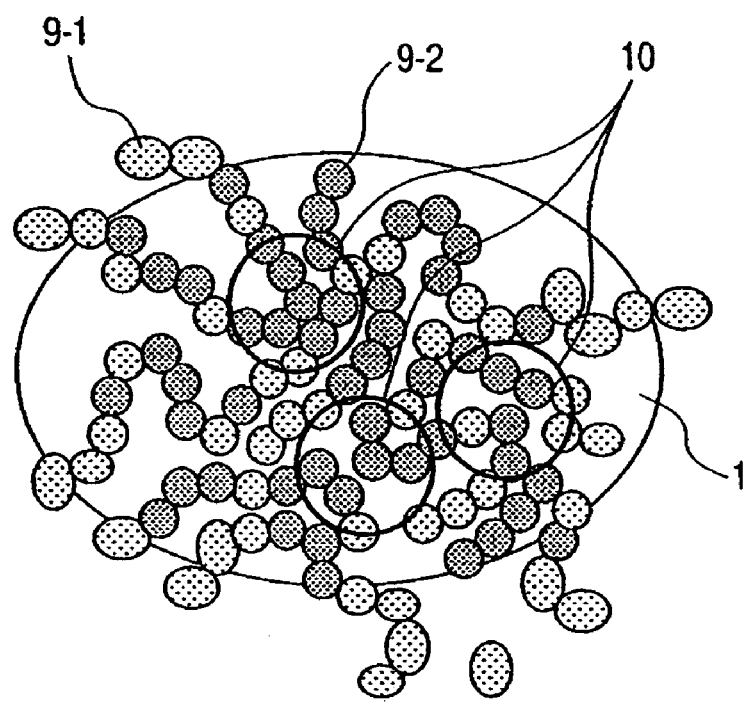
FIG. 4 is a schematic enlarged view showing a state of fusion of chargeable resin pseudo fine particles to a colorant in accordance with the present invention.

The state in which the chargeable resin pseudo fine particles fix to the colorant in the present invention is due to a strong interaction between the surface of the colorant and the chargeable resin pseudo fine particles, and is probably achieved in the following state. FIG. 4 is a schematic enlarged view showing an interface at which chargeable resin pseudo fine particles are in contact with the colorant. First, the chargeable resin pseudo fine particles 2 are formed by the entanglement of polymers constituted by various monomer unit compositions (denoted by 9-1 and 9-2 in the figure). Since the polymers locally have various structures at interfaces with the colorant 1, various states of the local surface energy are distributed. The colorant and a polymer strongly bind to each other at a point where the surface energy arising out of the chemical structure and surface structure of the colorant and the surface energy arising out of the chemical structure and surface structure of the polymer locally coincide with each other well (point indicated by a solid circle in the figure). Furthermore, as shown in FIG. 4, the interface at which a single chargeable resin pseudo fine particle is in contact with the colorant 1 has multiple points denoted by reference numeral 10 at each of which the surface energies of both the particle and the colorant locally coincide with each other. The fixing state of the present specification is expected to be established by strong interactions at the multiple points. In the present invention, a state in which, for example, 30% or more of the surface area of a chargeable resin pseudo fine particle is in contact with the colorant 1 as shown by 2' shown in FIG. 1B is conveniently referred to as "fusion", which is one form of fixing, and the chargeable resin pseudo fine particle and the colorant are not necessarily fused with each other at their interface.

In particular, in the chargeable resin pseudo fine particles, the polymers constituting the particles receive strong interactions among them, and may be entangled with each other to form physical cross-linkings. As a result, even when a chargeable resin pseudo fine particle has many hydrophilic groups, neither release of the fixed chargeable resin pseudo fine particles from the colorant nor continuous elution of a resin component having a hydrophilic group from the chargeable resin pseudo fine particles occurs. On the other hand, in such capsulation method as described in Japanese Patent Application Laid-Open No. H08-183920 described above, a resin having high hydrophilicity cannot strongly bind to a colorant, so the resin is released from the colorant, with the result that sufficient long-term stability may not be obtained.

An example of the merit of the dispersible colorant to be used in the present invention having the chargeable resin pseudo fine particles fixed to the colorant is that the specific surface area of the dispersible colorant increases owing to such form, and the charge which the chargeable resin pseudo fine particles have on their surfaces can be distributed to much area on the surface of the colorant. As a result, the dispersible colorant has a high specific surface area, and hence the charge which the chargeable resin pseudo fine particles have can be turned into surface charge of the dispersible colorant with extremely high efficiency. That is, the form of the dispersible colorant to be used in the present invention is a form with which an increased amount of surface charge is provided on the surface of the dispersible colorant with improved efficiency. Therefore, as compared to the above form typified by Japanese Patent Application Laid-Open No. H08-183920 in which a colorant is coated with a resin, high dispersion stability can be imparted even when the actual acid value or amine value of a resin component is lower.

In general, an organic pigment is insolubilized (made into a pigment) by the crystallization of colorant molecules having color developability owing to a strong interaction. In the case of a dispersible colorant using an organic pigment as the colorant to be used in the present invention, as described above, multiple interaction points are distributed at an interface between a chargeable resin pseudo fine particle and the colorant. Accordingly, a chargeable resin pseudo fine particle 11 fixes to several colorant molecules 1a of a pigment particle at the same time (see FIG. 5). Therefore, "pigment peeling" caused when the colorant molecules 1a are locally made hydrophilic by a hydrophilic group 12 as explained by FIGS. 6A and 6B does not occur in the present invention. Preferably, when an organic pigment is used as the colorant, the size of each of the chargeable resin pseudo fine particles is controlled to be smaller than the dispersion particle diameter of the pigment and larger than the size of the colorant molecule, whereby a dispersible colorant containing the organic pigment to which high dispersibility is imparted can be obtained without the disruption of the crystal structure of the pigment. In the present invention, a state in which chargeable resin pseudo fine particles "fix" to a colorant can be easily confirmed by means of the following approach involving three stages of separation. First, in first separation, the colorant to be observed and other water-soluble components (including also a water-soluble resin component) in ink or a water dispersing element are separated from each other. In second separation, the colorant in the precipitate obtained as a result of the first separation and a water-insoluble resin component are separated from each other. In third separation, a resin component weakly adsorbed and the dispersible colorant to which the chargeable resin pseudo fine particles fix are separated from each other to quantify the resin component in the supernatant obtained as a result of the third separation and to compare the precipitate obtained as a result of the second separation and the precipitate obtained as a result of the third separation. Thus, the fixing between the colorant and the chargeable resin pseudo fine particles is confirmed.

More specifically, such a state can be confirmed in a manner as described below. 20 g of the ink or the aqueous dispersion product in which the colorant is dispersed is regulated so as to make all the solid contents equal to about 10% by mass. Then, the first separation step is conducted in a centrifugal separator under the condition of 12,000 rpm for 60 minutes. Of the separation products, the precipitate of the lower layer that contains the colorant is redispersed in 3 times volume of pure water and subjected to the second separation step in a centrifugal separator under the condition of 80,000 rpm for 90 minutes. Of the separation product, again, the precipitate of the lower layer that contains the colorant is redispersed in 3 times volume of pure water and subjected to the third separation step in a centrifugal separator under the condition of 80,000 rpm for 90 minutes. Then, the precipitate of the lower layer that contains the colorant is taken out. A specimen of the precipitate produced by the second separation step is taken so as to contain solid by about 0.5 g and another specimen of the precipitate produced by the third separation step is taken so as to contain solid by about 0.5 g. Then, the both specimens are dried under reduced pressure at 30° for 18 hours and observed through a scanning electron microscope with a magnification of 50,000×. If it is confirmed by microscopic observation that a plurality of pieces of a fine particulate substance or similar fine agglomerates are adhering to the surface of the dispersible colorant and the precipitate of the second separation step and that of the third separation step have the same shape, it is judged that resin pseudo fine particles are fixed to the colorant. Additionally, about a half by volume of the supernatant of the upper layer produced by the third separation step is taken from above and dried at 60 for 8 hours. Then, computationally determine the solid content on the basis of the change in the mass before and after the drying. If the change of the solid content is smaller than 1% by mass, it is judged that no resin pseudo fine particles have left the dispersible colorant and the resin pseudo fine particles are fixed to the dispersible colorant.

While the above described separation process is a preferred example for the purpose of the present invention, any separation process or method that can achieve the objectives of the above-described first to third separation steps may be used for determining the state of a dispersible colorant in accordance with the invention. More specifically, the objective of the first separation step is to separate the resin component and the water-soluble component if the ink or the aqueous dispersion product contains a colorant and a resin component adsorbed to the colorant. The objective of the second separation step is to separate the colorant and the resin component that is fixed to the colorant from the resin component that is adsorbed to the colorant. The objective of the third separation step is to make sure that the resin component that is fixed to the colorant does not leave the colorant. Any separation techniques including those that are known and those that are newly developed may be used for the purpose of the present invention so long as such techniques can achieve the objectives of the first to third separation steps. Additionally, the number of steps may be larger than or smaller than three.

A second feature of the dispersible colorant to be used in the present invention lies in that the dispersible colorant can be singly dispersed into an aqueous medium while the chargeable resin pseudo fine particles 2 fix to the water-insoluble colorant 1. As described above, the dispersible colorant to be used in the present invention is essentially a self-dispersible colorant which can be stably dispersed in water or an aqueous ink without the aid of any other surfactant, polymer dispersant, or the like. The definition of, and a method of judging, the self-dispersible colorant will be described in detail later. Accordingly, the dispersible colorant to be used in the present invention eliminates the need for adding a polymer dispersant, or any other resin component or surfactant component, which may possibly be released after a long period of time, for the purpose of stabilizing the dispersion of the colorant. As a result, when the dispersible colorant to be used in the present invention is used as aqueous ink, the degree of freedom of design with respect to any component other than the dispersible colorant increases. Accordingly, for example, aqueous ink capable of providing a sufficiently high printing density even on a recording medium having high penetrability of ink such as plain paper can be obtained.

The self-dispersibility of the dispersible colorant to be used in the present invention can be confirmed, for example, as follows. The self-dispersibility of the dispersible colorant in accordance with the invention can be confirmed typically in a manner as described below. The ink or the aqueous dispersion product in which the colorant is dispersed is diluted to 10 times volume with pure water and then condensed by means of an ultra-filtration filter of a cutoff molecular weight of 50,000 to restore the original concentration. The condensate solution is subjected to a separation process using a centrifugal separator under the condition of 12,000 rpm for 2 hours. Then, the precipitate is taken out and redispersed in pure water. If the precipitate can be redispersed well, the colorant is judged to have self-dispersibility. The well re-dispersion can be determined comprehensively by the facts that uniform dispersion can be confirmed by visual observation, that a remarkable precipitate is not produced when left to stand for one to two hours, or if any, it disappears when shaken lightly, and that when the diameters of the dispersed particles are measured by the dynamic light scattering method, the average particle diameter is not more than twice the particle diameter before the processing.

As described above, the dispersible colorant to be used in the invention takes a form that has a high specific surface area by having chargeable resin pseudo fine particles fixed to the colorant, and much electric charge is carried by the wide surface to realize excellent storage stability. Therefore, chargeable resin pseudo fine particles provide a great advantage when they are fixed to the colorant in a large number in a scattered manner. Particularly, it is preferable that the chargeable resin pseudo fine particles that are fixed to the colorant are apart from each other by a given distance and distributed uniformly. It is more preferable that a part of the surface of the colorant is exposed between the chargeable resin pseudo fine particles.

Such a form can be confirmed when a dispersible colorant in accordance with the invention is observed through a transmission electron microscope or scanning electron microscope. More specifically, it will be observed that a plurality of chargeable resin pseudo fine particles are fixed to the surface of the colorant and the surface of the colorant is exposed between the chargeable resin pseudo fine particles fixed to the surface. Incidentally, chargeable resin pseudo fine particles may be observed to be partly located very close to each other and in some cases fused. However, even in this case, when they are separated from each other by a certain distance as a whole; the surface of the colorant is partly exposed; and such a state is distributed, it is obvious to those skilled in the art that the chargeable resin pseudo fine particles can be considered to be scattered with regard to and fixed to the colorant.

Furthermore, an aqueous ink containing the dispersible colorant to be used in the present invention having the above features is found to exhibit excellent quick-drying ability on a recording medium. Although the reason therefor is unclear, it is probably based on the following mechanism. As described above, the dispersible colorant is dispersed into the ink in a state in which the chargeable resin pseudo fine particles fix to the surface of the colorant. When the ink reaches the recording medium, an aqueous solvent in the ink (hereinafter referred to as ink solvent) is absorbed by fine pores on the recording medium by virtue of capillarity (the pores are gaps between cellulose fibers in the case of plain paper, and pores of a receiving layer in the case of coated paper or glossy paper). At this time, because of the feature to shape of the dispersible colorant to be used in the present invention, the chargeable resin pseudo fine particles are located scatteringly at portions where colorants are adjacent to each other to form a large number of fine gaps. Accordingly, the capillarity acts on the ink solvent present between colorants, so the ink solvent is quickly absorbed in the recording medium. The quick-drying ability is expected to be achieved through the mechanism described above based on the fact that the aqueous ink in accordance with the present invention using the dispersible colorant having the chargeable resin pseudo fine particles interspersing on its surface exhibits more preferable quick-drying ability.

The surface functional group density of the dispersible colorant in accordance with the present invention is preferably 250 µmol/g or more and less than 1,000 µmol/g, or more preferably 290 µmol/g or more and less than 900 µmol/g, in mass average. When the dispersible colorant has a surface functional group density smaller than 250 µmol/g, the long-term storage stability of the dispersible colorant may deteriorate. When the dispersible colorant has a surface functional group density considerably larger than 1,000 µmol/g, the dispersion stability is so high that the dispersible colorant is apt to penetrate into a recording medium, and a high printing density is hardly secured in some cases.

The surface functional group density is determined, for example, as follows. First, a highly excessive amount of an aqueous HCl solution is added to an aqueous dispersion or ink containing the dispersible colorant for the measurement and forced to precipitate in a centrifugal separator under the condition of 20,000 rpm for 60 minutes. After the precipitate is collected and redispersed in pure water, the solid content is measured by a drying method. The redispersed precipitate is weighed and a known amount of sodium hydrogen carbonate is added. Then, the liquid containing the dispersed precipitate is stirred and subjected to a centrifugal operation in a centrifugal separator under the condition of 80,000 rpm for 2 hours for precipitation. The supernatant is weighed and titrated with 0.1 N hydrochloric acid for neutralization and the surface functional group density is determined in terms of the number of moles per 1 g of the dispersible colorant by subtracting the known amount of sodium hydrogen carbonate from the amount for neutralization.

Next, the respective components constituting the dispersible colorant to be used in the present invention will be described.

(Colorant)

A colorant, which is one of the components of the dispersible colorant to be used in the present invention, will be described hereinafter. As the colorant to be used in the present invention, of the conventionally known colorants and the newly developed colorants, a colorant which is insoluble in water and can be stably dispersed in water together with a dispersant is desirably used. Examples of such colorant include a hydrophobic dye, an inorganic pigment, an organic pigment, a metal colloid, and a colored resin particle. The water-insoluble colorant in accordance with the invention, when dispersed to form particles, has a particle diameter of preferably not less than 0.01 µm but no more than 0.5 µm (not less than 10 nm but no more than 500 nm), more preferably not less than 0.03 µm but no more than 0.3 µm (not less than 30 nm but no more than 300 nm). A dispersible colorant using a colorant having a dispersion particle diameter within the above identified range, when used for an aqueous ink, gives a preferable image having high coloring power and high weatherfastness. Incidentally, the above described diameter of dispersed particles is a cumulant average value of the particle diameters observed by a dynamic light scattering method.

Examples of inorganic pigments that can effectively be used as colorant for the purpose of the present invention include carbon black, titanium oxide, zinc white, zinc oxide, Tripon, iron oxide, cadmium red, molybdenum red, chrome vermillion, molybdate orange, yellow lead, chromium yellow, cadmium yellow, yellow iron oxide, titanium yellow, chromium oxide, Pyridian, cobalt green, titanium cobalt green, cobalt chromium green, deep blue, ultramarine blue, Prussian blue, cobalt blue, cerulean blue, manganese violet, cobalt violet and mica.

Examples of organic pigments that can effectively be used as colorant for the purpose of the present invention include those based on azo, azomethine, polyazo, phthalocyanine, quinacridone, anthraquinone, indigo, thioindigo, quinophthalone, benzimidazolone, isoindoline and isoindolinone.

Examples of organic water-insoluble colorants that can be used for the purpose of the present invention include hydrophobic dyes, such as those based on azo, anthraquinone, indigo, phthalocyanine, carbonyl, quinoneimine, methine, quinoline and nitro. Of these, dispersed dyes are particularly preferable.

(Chargeable Resin Pseudo Fine Particles)

The chargeable resin pseudo fine particle, which is another component of the dispersible colorant to be used in the present invention, is defined as a microbody formed by agglomeration of resin components of sufficiently high polymerization degree, which is substantially insoluble in water and is smaller than a dispersion unit (dispersion particle diameter) in water (or ink) of a colorant to which the fine particle fixes. The microbody has a pseudosphere like shape, or the sizes of plural microbodies (the chargeable resin pseudo fine particles) are uniform to fall within a certain range. Preferably, the resin component of the chargeable resin pseudo fine particles is physically or chemically cross-linked. A technique as described below may be used to see whether the resin component of chargeable resin pseudo fine particles is cross-linked or not. The resin component constituting chargeable resin pseudo fine particles is estimated in advance by means of a known analysis method and linear chain polymers that have the same chemical structure (or the same monomer unit composition) are synthesized by solution polymerization and both the chargeable resin pseudo fine particles and the polymer are immersed in an organic solvent that dissolves the polymer well to compare them in terms of solubility. It is confirmed that the chargeable resin pseudo fine particles are internally cross-linked when the solubility of the chargeable resin pseudo fine particles is lower than that of the polymer.

Further, in another preferred manner, when the diameters of chargeable resin pseudo fine particles can be observed by, for example, a dynamic light scattering method, the cumulant average value of the diameters of dispersed particles in water is preferably not less than 10 nm but no more than 200 nm. Moreover, from the viewpoint of long-term storage stability of the dispersible colorant, it is further preferable that the polydispersity index of the dispersion particle diameters is suppressed to less than 0.2. If the average value of the diameters of dispersed particles is more than 200 nm or the polydispersity index is more than 0.2, it may not be possible to achieve the essential object of dispersing the colorant as fine particles to effect stabilization. If, on the other hand, the average value of the diameters of dispersed particles is less than 10 nm, it may not be possible to maintain the form of chargeable resin pseudo fine particles and the resin may easily become dissolved in water to make it impossible to provide the advantages of the present invention. The advantage of dispersing the colorant to effect stabilization through the fixing of chargeable resin pseudo fine particles to the colorant in accordance with the present invention is effectively realized when the average value of the diameters of dispersed particles is not les than 10 nm and not more than 200 nm and the diameters of chargeable resin pseudo fine particles are smaller than those of the colorant. The above-described preferred embodiment is applicable even when it is not possible to measure the dispersion particle diameters of chargeable resin pseudo fine particles. If such is the case, it is believed that the average diameter of chargeable resin pseudo fine particles observed with an electron microscope would fall within the above-mentioned preferred range or be in the vicinity thereof.

Further, when the colorant is an organic pigment, by setting chargeable resin pseudo fine particles to be smaller than the dispersion particle diameter of the pigment and larger than molecules of the colorant, in addition to falling within the above range, it is possible to obtain a dispersible colorant that is structurally highly stable and has a high dispersibility, which is particularly preferable.

The term "electric chargeability" herein employed refers to a state in which they themselves have functional groups that are ionized in any form in an aqueous medium and desirably they are capable of self-dispersing due to the electric chargeability. Therefore, whether particles in question are chargeable resin pseudo fine particles or not can be determined by methods, which include, for example, one of measuring the surface zeta potential of the fine particles by means of an appropriately selected known technique, one of conducting potentiometric titration to compute the functional group density by means of a technique as will be described hereinafter, one of adding an electrolyte to an aqueous dispersion of fine particles and confirming the dependency of the dispersion stability on the concentration of the electrolyte and one of conducting a chemical structure analysis on fine particles and determining the existence/absence of ionic functional groups.

The resin component constituting the chargeable resin pseudo fine particles is not limited, and may be selected from any natural or synthetic polymeric compound, and the polymeric compound newly developed for the present invention. Those useful for the resin component for the present invention include acrylic, styrene/acrylic, polyester, polyurethane and polyurea resin, and polysaccharides and polypeptides. In particular, polymers and copolymers of monomers having a radically polymerizable unsaturated bond, into which acrylic resin and styrene/acrylic resin are classified, are preferably used because they can be generally used and easily processed to design functions of the pseudo-fine, chargeable particles.

Specific examples thereof include: monomers each having a carboxyl group such as acrylic acid, methacrylic acid, crotonic acid, ethacrylic acid, propyl acrylic acid, isopropyl acrylic acid, itaconic acid, and fumaric acid, and salts of them; anionic hydrophilic monomers each having a sulfonic group such as styrenesulfonic acid, sulfonic acid-2-propylacrylamide, acrylic acid-2-ethyl sulfonate, methacrylic acid-2-ethyl sulfonate, and butyl acrylamide sulfonic acid, and salts of them; and anionic hydrophilic monomers each having a phosphonic acid group such as methacrylic acid-2-ethyl phosphonate and acrylic acid-2-ethyl phosphonate.

A resin which constitutes chargeable resin pseudo fine particles to be suitably used in the present invention preferably has a glass transition temperature of −40° C. to 60° C. A glass transition temperature within the range imparts high film formability (film forming ability) to the chargeable resin pseudo fine particles, whereby colorants adjacent to each other on recording paper can form a film, thereby forming a strong colored film. Therefore, the use of a dispersible colorant having such constitution can impart high rubfastness to a printed matter to be obtained.

The glass transition temperature for the chargeable resin pseudo fine particles can be measured according to the following procedure. A dispersible colorant is subjected to acid precipitation with hydrochloric acid or the like to recover the precipitate. Furthermore, the precipitate is subjected to Soxhlet extraction by means of an organic solvent such as tetrahydrofuran (THF), and then the organic solvent is distilled off to prepare chargeable resin pseudo fine particles fixing to a colorant. The resultant chargeable resin pseudo fine particle components are subjected to differential scanning calorimetry to measure the glass transition temperature. For example, an apparatus such as a DSC822e (trade name) manufactured by METTLER-TOLEDO International Inc. is desirably used. An aqueous dispersion liquid in which a dispersible colorant and a water-soluble nonionic resin coexist can be separated by means of a centrifugal separator. For example, when the aqueous dispersion liquid is centrifuged at 12,000 rpm, the dispersible colorant can be obtained as a precipitate.

When the above-described conditions are satisfied, by further selecting appropriately the kinds and copolymerization ratios of monomers having a radically polymerizable unsaturated bond of the resin components constituting the chargeable resin pseudo fine particles, additional functions can be imparted to the dispersible colorant of the present invention and the chargeable resin pseudo fine particles fixing to the colorant. Specific examples of the monomers include hydrophobic monomers, such anionic hydrophilic monomers as described above, and nonionic hydrophilic monomers.

Examples of the hydrophobic monomers include (meth) acrylic esters, e.g., methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, iso-butyl methacrylate, t-butyl methacrylate, tridecyl methacrylate and benzyl methacrylate; styrene-based monomers, e.g., styrene, α-methylstyrene, o-methylstyrene, m-methylstyrene, p-methylstyrene and p-tert-butylstyrene; itaconic acid esters, e.g., benzyl itaconate; maleic acid esters, e.g., dimethyl maleate; fumaric acid esters, e.g., dimethyl fumarate; and acrylonitrile, metahcrylonitrile and vinyl acetate.

Examples of the hydrophilic monomers having an anionic group include those described above.

Specific examples of the nonionic hydrophilic monomers include: monomers having a radically polymerizable unsaturated bond and a hydroxyl group showing strong hydrophilicity in its structure at the same time such as hydroxyethyl (meth)acrylate and hydroxypropyl (meth)acrylate; and monomers containing alkylene oxide group such as methoxy polyethylene glycol (meth)acrylate, ethoxy polyethylene glycol (meth)acrylate, polyethylene glycol (meth)acrylate, and polypropylene glycol (meth)acrylate. In addition, various conventionally known or novel oligomers, macromonomers, and the like can be used without any limitation.

Particularly, the alkylene oxide group-containing monomer is excellent in copolymerizability with the above-mentioned hydrophobic monomer component, and provides good results in terms of the uniformity of the surface properties of the chargeable resin pseudo fine particles, and uniform fixing ability and fusion to the colorant.

By changing a large number of control factors such as the kinds and copolymerization ratio of monomers constituting the chargeable resin pseudo fine particles and the kind and concentration of a polymerization initiator to be used at the time of preparation of the polymer, various properties of the dispersible colorant and the chargeable resin pseudo fine particles can be appropriately controlled. Particularly, forming the chargeable resin pseudo fine particles of a copolymer of monomer components containing at least one kind of hydrophobic monomer and at least one kind of hydrophilic monomer of the monomers listed above. At this time, by constituting the chargeable resin pseudo fine particles by using at least one kind of hydrophobic monomer, good fixing ability to the colorant and good thermal stability can be imparted. Similarly, by constituting the chargeable resin pseudo fine particles by using at least one kind of hydrophilic monomer, good shape controllability and good dispersion stability can be imparted. Therefore, the simultaneous use of these monomers makes it possible to provide chargeable resin pseudo fine particles which fix well to the colorant at all times and have good dispersion stability.

(Synthesis of Chargeable Resin Pseudo Fine Particles and Fixing to Colorant)

Synthesis of the chargeable resin pseudo fine particles and fixing to the colorant can be performed by a conventionally known method of synthesizing chargeable resin pseudo fine particles and a method of combining chargeable resin pseudo fine particles and a colorant. In this regard, the present inventors have made extensive studies to invent a method of easily producing a dispersible colorant having a colorant and chargeable resin pseudo fine particles smaller than the colorant in which the chargeable resin pseudo fine particles fix to the colorant, which is the characteristic feature of the present invention. Hereinafter, a preferable method of producing a dispersible colorant with which the dispersible colorant to be used in the present invention can be easily obtained will be described.

The present inventors have made extensive studies to find that the dispersible colorant to be used in the present invention having such properties as described above can be extremely easily produced by applying an aqueous precipitation polymerization method under the following conditions. The production method involves: dispersing a water-insoluble colorant by means of a dispersant to prepare an aqueous solution having the water-insoluble colorant dispersed therein; and allowing chargeable resin pseudo fine particles to fix to the colorant in the aqueous solution through a step of subjecting a radically polymerizable monomer to aqueous precipitation polymerization by means of an aqueous radical polymerization initiator. The dispersible colorant obtained through the step of aqueous precipitation polymerization is a water-insoluble colorant in which the chargeable resin pseudo fine particles synthesized during the aqueous precipitation polymerization are strongly fixed to the colorant in a uniformly scattered sate, so that the colorant can be dispersed singly with excellent dispersion stability. In addition, in the course of the aqueous precipitation polymerization, the properties of the chargeable resin pseudo fine particles can be easily controlled to such preferable forms as described above. At that time, the fixing state of the colorant and the chargeable resin pseudo fine particles, which is characteristic of the present invention, is favorably achieved. Hereinafter, a preferred embodiment in the production method will be described in more detail.

(Dispersion of Water-Insoluble Colorant)

First, such water-insoluble colorant to be preferably used in the present invention as described above is dispersed by means of a dispersant to prepare a water dispersing element. Any dispersant including an ionic dispersant, a nonionic dispersant, or the like can be used for dispersing the colorant into an aqueous solution. Of those, a polymer dispersant or a water-soluble polymer is desirably used from the viewpoint of maintaining dispersion stability in a subsequent polymerization step. One which exhibits sufficient water solubility and has a hydrophobic portion serving as an adsorption site to the surface of a colorant fine particle and to an oil droplet interface of a radically polymerizable monomer to be added in a polymerization step, especially a hydrophobic monomer, is particularly preferably used. Further, it is more preferable from the viewpoint of easily inducing the chargeable resin pseudo fine particles to become fixed to the colorant in the subsequent polymerization step that at least one kind of the hydrophobic monomers to be used in the subsequent polymerization step exists as a unit of the dispersing agent.

Methods of producing a polymer dispersant and a water-soluble polymer each of which can function as a dispersant that can be used in the present invention are not particularly limited. For example, they can be produced by causing monomers having an ionic group and other polymerizable monomers to react with each other in a non-reactive solvent in the presence or absence of a catalyst. Particularly, it has been found that favorable results can be obtained by using a dispersing agent selected from styrene/acrylic polymer compounds that are obtained by polymerizing the above-mentioned ionic-group-containing monomers and styrene monomers as indispensable components and ionic-group-containing acrylic polymer compounds that are obtained by polymerizing ionic-group-containing monomers and (meth) acrylate monomers having 5 or more carbon atoms as indispensable components. At this time, it is preferable to select an anionic dispersing agent when the dispersible colorant to be obtained is expected to have an anionic group, whereas it is preferable to select a cationic or anionic dispersing agent when the dispersible colorant to be obtained is expected to have a cationic group.

In the subsequent process of aqueous precipitation polymerization, it is desirable to use an anionic polymer dispersing agent showing an acid value not less than 100 but no more than 250 or a cationic polymer dispersing agent showing an amine value not less than 150 but no more than 300. If the acid value or the amine value is less than the corresponding lower limit value, the affinity between the hydrophobic monomer and the dispersant becomes higher than the affinity between the colorant and the dispersant at the time of aqueous precipitation polymerization, so the chargeable resin pseudo fine particles is released from the surface of the colorant before they fix to the colorant, and the dispersed state cannot be maintained in some cases. If, on the other hand, the acid value or the amine value is more than the corresponding upper limit value, the excluded volume effect and the electrostatic repulsive force of the dispersing agent become too strong on the colorant surface so that there may be occasions where chargeable resin pseudo fine particles are prevented from fixing to the colorant. When an anionic dispersing agent is used, it is preferable to select a dispersing agent having a carboxyl group as an anionic group so as not to prevent resin fine particles from fixing to the colorant.

In the process of forming an aqueous dispersion of an water-insoluble colorant by using a dispersant, the colorant is dispersed such that the average value of the dispersion particle diameter is preferably within the range of not less than 0.01 µm and not more than 0.5 µm (not less than 10 nm and not more than 500 nm), more preferably within the range of not less than 0.03 µm and not more than 0.3 µm (not less than 30 nm and not more than 300 nm). Because the dispersion particle diameters in this process are reflected significantly to the dispersion particle diameters of the dispersible colorant obtained, the above-described ranges are preferable from the viewpoint of the coloring power, weatherfastness of an image and dispersion stability.

The dispersion particle diameters of a water-insoluble colorant in accordance with the invention are preferably distributed to show a monodispersion. Although the particle diameter distribution of a dispersible colorant having chargeable resin pseudo fine particles fixed thereto generally tends to be narrower than the particle diameter distribution of the aqueous dispersion obtained before the polymerization step illustrated in FIG. 2B, it basically depends on the particle diameter distribution of the aqueous dispersion. Additionally, also in order to surely effect the fixing of the chargeable resin pseudo fine particles to the colorant through hetero aggregation, it is important to narrow the particle diameter distribution of the colorant. According to the studies conducted by the present inventors, it has been found that the obtained dispersible colorant shows excellent dispersion stability when the polydispersity index of the colorant is within the range of 0.25 or less.

The diameters of dispersed particles of a colorant can vary among various measuring methods, and in particular, an organic pigment is rarely dispersed in the form of spherical particles. In the present invention, the diameters of particles of a colorant are measured on the basis of the principle of the dynamic light scattering method, using ELS-800 (trade name) manufactured by Otsuka Electronics Co., Ltd, and then the average particle diameter and the polydispersity index that are determined by cumulant analysis are used.

A method of dispersing a water-insoluble colorant in water may be any one of such methods each involving the use of a dispersant as described above of the methods with each of which the colorant can be stably dispersed into water under such conditions as described above, and is not limited to any one of the conventionally known methods. Alternatively, the method may be a dispersion method newly developed for the present invention. In general, for example, when the water-insoluble colorant is a pigment, the addition amount of a polymer dispersant to be used is suitably 10 mass % or more and 130 mass % or less with respect to the pigment.

Means for dispersing a colorant to be used in the present invention is not limited as long as it is generally used for each colorant, and examples thereof include: dispersing devices such as a paint shaker, a sand mill, an agitator mill, and a three-roll mill; high-pressure homogenizers such as a microfluidizer, a nanomizer, and an altimizer; and ultrasonic dispersing devices.

(Aqueous Precipitation Polymerization)

Subsequently, a preferred embodiment of the aqueous precipitation polymerization, which is a step involving synthesizing the chargeable resin pseudo fine particles which are characteristic of the present invention and allowing the particles to fix to the colorant, will be described. It should be noted that the present invention is not limited to the embodiment to be described below. FIGS. 2A, 2B, 2C, and 2D schematically show a step flow of the production method. The course of obtaining a dispersible colorant through the steps is considered to be as follows. First, as shown in FIG. 2A, a colorant 1 is dispersed into an aqueous solution by means of a dispersant 3 to prepare an aqueous dispersion liquid. At this time, the colorant 1 is stably dispersed owing to adsorption of the dispersant 3, and the adsorption is in thermal equilibrium. Next, the aqueous dispersion liquid prepared as shown in FIG. 2A is heated while being stirred, and monomer components 4 are added to the dispersion liquid together with, for example, an aqueous radical polymerization initiator 5 (see FIG. 2B). The added radical polymerization initiator 5 is cleaved by heating to generate a radical which contributes to a reaction between a hydrophobic monomer dissolved in a trace amount in the aqueous phase and a water-soluble monomer in the aqueous phase of the monomer components added to the aqueous dispersion liquid.

Figure 3:
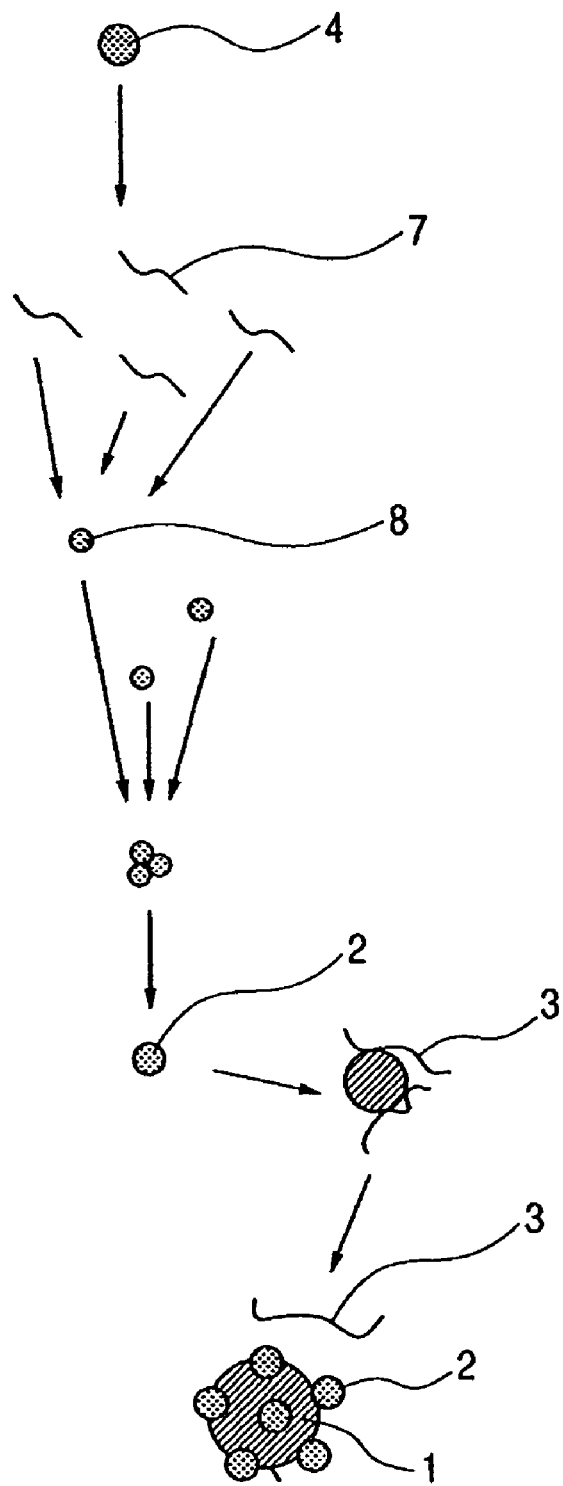
FIG. 3 is a schematic view showing a process of purification of flat chargeable resin pseudo fine particles and fusion of the particles to a colorant in the production method in accordance with the present invention.

FIG. 3 is a schematic view showing, in a stepwise manner, the course in which the monomers 4 shown in FIG. 2C polymerize to produce a dispersible colorant. Once such reaction of the monomers 4 as described above proceeds, an oligomer 7 produced by the polymerization reaction of the monomer components becomes insoluble in water, and is precipitated as a precipitate 8 from the aqueous phase. However, the oligomers 7 as the precipitates 8 do not have sufficient dispersion stability, so they unite with each other to form chargeable resin pseudo fine particles 2 having a sulfonic acid group. The chargeable resin pseudo fine particles 2 further effect hetero aggregation, utilizing the hydrophobic surface of the colorant 1 in the aqueous dispersion solution as a seed so that the surface of the colorant 1 strongly adsorb the resin component constituting the chargeable resin pseudo fine particles 2 by a hydrophobic interaction. At this time, the polymerization reaction is still progressing inside of the chargeable resin pseudo fine particles 2 to increase the number of adsorption spots on the surface of the colorant 1 and change themselves so as to take a shape that is more stable in terms of energy. At the same time, physical crosslinks are formed inside of the chargeable resin pseudo fine particles 2 to a high degree so that the chargeable resin pseudo fine particles take a fixed state in which they are most stably adsorbed by the colorant 1 to thereby become a fixing state. On the other hand, the colorant 1 is stabilized as a plurality of chargeable resin pseudo fine particles are fixed thereto so that the dispersing agent 3 that has been in an equilibrium state leaves from the surface of the colorant.

Figure 5:
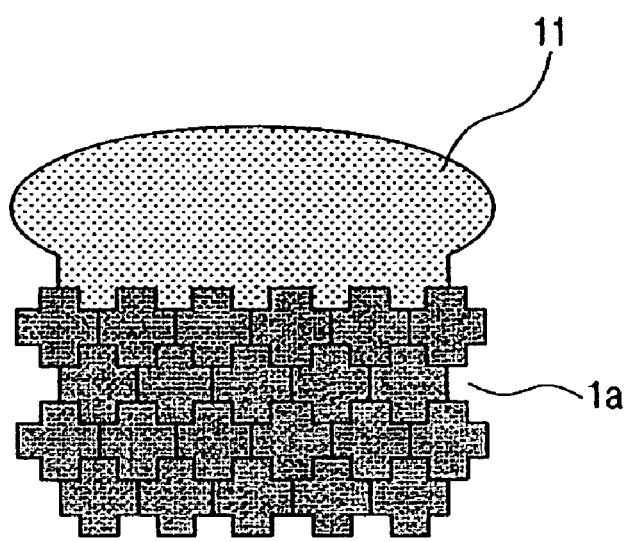
FIG. 5 is a schematic enlarged view showing an interface at which chargeable resin pseudo fine particles are fused to a colorant in accordance with the present invention.
Figure 6A:
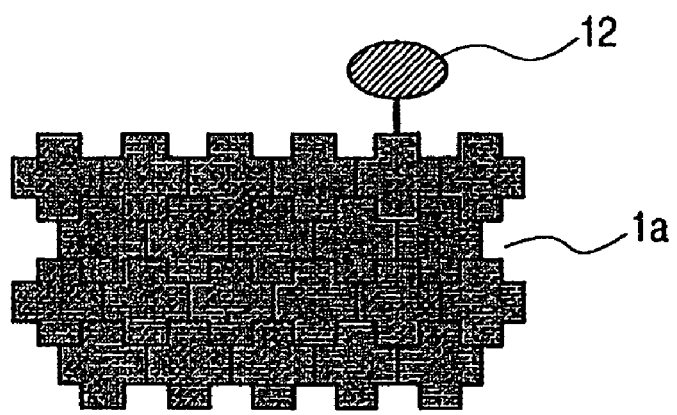
FIGS. 6A and 6B are schematic views showing a pigment peeling phenomenon occurring in the technique of directly modifying an organic pigment with a hydrophilic group, representatively disclosed in Japanese Patent Application Laid-Open No. H10-195360.
Figure 6B:
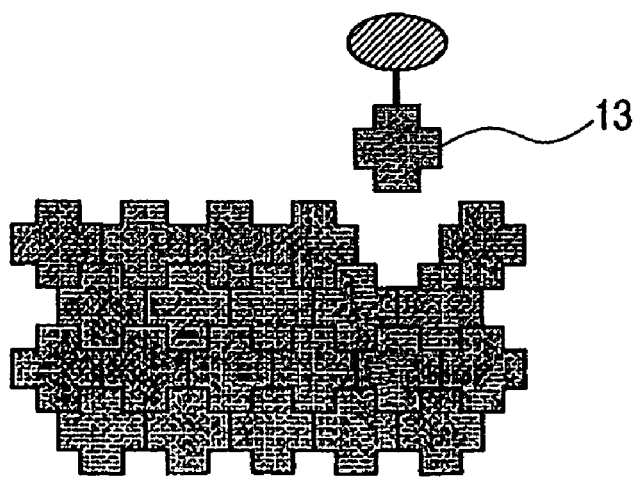

FIG. 4 is a schematic view showing the chargeable resin pseudo fine particles 2 thus obtained on the side of an interface at which they fix to the colorant 1. As shown in FIG. 4, a chargeable resin pseudo fine particle as an aggregate of resin components has a hydrophilic monomer unit 9-1, a hydrophobic monomer unit 9-2, and the like arbitrarily distributed therein. Therefore, the local surface energy of the particle has a distribution, and there are many points of adsorption 10 each having the surface energy coinciding with that of the colorant. FIG. 5 is a schematic enlarged view showing an interface portion at which a part of the chargeable resin pseudo fine particle 11 fixes to some molecules 1a of a colorant particle. As shown in the figure, at the interface, the chargeable resin pseudo fine particle 11 stably fixes to several molecules 1a of the colorant with its shape being changed in accordance with the surface shape of those molecules 1a while it adsorbs the points of adsorption

10 shown in FIG. 4. As described above, in this process as well, a polymerization reaction proceeds inside the chargeable resin pseudo fine particles, so the particles fix to the colorant while being stably adsorbed and fixed to the colorant. Through the above process, the dispersible colorant having such constitution as described above is easily formed (see FIG. 2D). At this time, in a system where the chargeable resin pseudo fine particles achieve self-dispersibility while having sufficient surface charge, electrostatic repulsive force acts between the chargeable resin pseudo fine particles in the processes of adsorption and fixing to the colorant by virtue of hetero agglomeration. As a result, the chargeable resin pseudo fine particles fix to the colorant scatteringly, which is the preferred embodiment described above.

The polymerization reaction conditions, which vary depending on the characteristics of a polymerization initiator, dispersant, and monomers used, include a reaction temperature of 100° C. or less, preferably 40° C. or more and 80° C. or less, a reaction time of 1 hour or more, preferably 6 hours or more and 30 hours or less, and a stirring speed during a reaction of 50 rpm or more and 500 rpm or less, preferably 150 rpm or more and 400 rpm or less.

In particular, when monomer components containing at least one kind of hydrophobic monomer and at least one kind of hydrophilic monomer are polymerized to produce chargeable resin pseudo fine particles in the above process, the monomer components are preferably added dropwise to an aqueous dispersion liquid of a water-insoluble colorant containing an aqueous radical polymerization initiator. Alternatively, the monomer components may be added simultaneously with the aqueous radical polymerization initiator to the aqueous dispersion liquid of the water-insoluble colorant, or may be added dropwise to the dispersion separately from the initiator. To uniformly obtain desired chargeable resin pseudo fine particles from a mixture of monomers having different characteristics such as a hydrophobic monomer and a hydrophilic monomer, a copolymerization ratio of the monomers having different characteristics is desirably kept constant at all times. When an excessive amount of the mixture of the monomers is added with respect to the amount of monomers to be consumed for a polymerization reaction during a certain period of time, there is a tendency that only specific monomer species are polymerized in advance, and the other monomers are polymerized after the monomers polymerized in advance have been consumed. In this case, the characteristics of chargeable resin pseudo fine particles to be produced show large nonuniformity. Particles having a large content of hydrophilic monomer component of the chargeable resin pseudo fine particles thus produced may be unable to fix to the surface of the colorant.

Furthermore, a resin component having a large content of hydrophilic monomer component cannot be precipitated owing to its high hydrophilicity, and remains, in a system, as a water-soluble resin component without forming chargeable resin pseudo fine particles in some cases. By adding dropwise monomer components to an aqueous dispersion liquid of a water-insoluble colorant containing an aqueous radical polymerization initiator, chargeable resin pseudo fine particles of a desired copolymerization ratio in which a copolymerization ratio between a hydrophobic monomer and a hydrophilic monomer is kept constant at all times can be uniformly obtained.

Further, in particular, when an anionic monomer such as acrylic acid or methacrylic acid is added as a hydrophilic monomer to a polymerization system, the monomer may be partly destabilized depending on the characteristics of a polymer dispersant used for dispersing a colorant to thereby agglomerate. To prevent this phenomenon, the anionic monomer is preferably neutralized in advance and added in the state of a sodium salt or a potassium salt.

In preparing aqueous ink by using the water-insoluble colorant in accordance with the present invention obtained through the above steps in which the chargeable resin pseudo fine particles fix to the colorant, a purification treatment is desirably performed in addition to the above steps. In particular, in the foregoing, it is important to purify an unreacted polymerization initiator, monomer components, dispersant, water-soluble resin components and chargeable resin pseudo fine particle that did not fix, and the like in order to maintain the storage stability of the dispersible colorant at a high level. An optimum method can be selected from the purification methods generally used. For example, purification through centrifugation or ultrafiltration is also preferable.

Through the above steps, a dispersible colorant in which chargeable resin pseudo fine particles composed of a desired copolymer fix to the surface of a colorant can be obtained by controlling a large number of control factors. In particular, when an anionic monomer is used for the purpose of obtaining high dispersion stability, the dispersible colorant that is produced through the steps of the present invention can have a large surface functional group density even when the amount of the anionic monomer to be used in the above steps is relatively small, so that high dispersion stability can be imparted. As a result, the dispersion stability of the chargeable resin pseudo fine particles can be improved without affecting the long-term storage stability.

Although the reason for the above is unclear, the present inventors consider as follows. When a radical generated in water initiates polymerization so that oligomers are precipitated to form chargeable resin pseudo fine particles, a portion having a large amount of components derived from an anionic monomer preferentially orients on a side of an aqueous phase, that is, in the vicinity of the surfaces of the chargeable resin pseudo fine particles. This state is maintained even after the chargeable resin pseudo fine particles have fixed to a colorant. Furthermore, in the dispersible colorant to be used in the present invention having a structurally large specific surface area, a large number of anionic groups derived from an anionic monomer component are present. As a result, the dispersible colorant obtained by means of the production method described above is expected to stabilize with the aid of a reduced amount of anionic monomer components.

(Water-soluble Nonionic Resin)

Figure 7A:
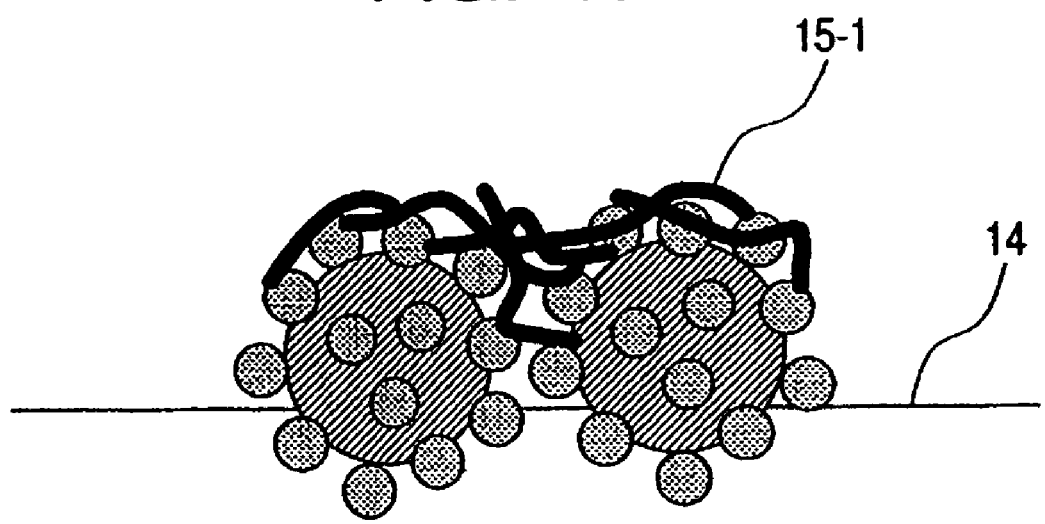
FIGS. 7A and 7B are schematic views showing how a water-soluble nonionic resin forms a film at a gap between dispersible colorants on a recording medium.
Figure 7B:
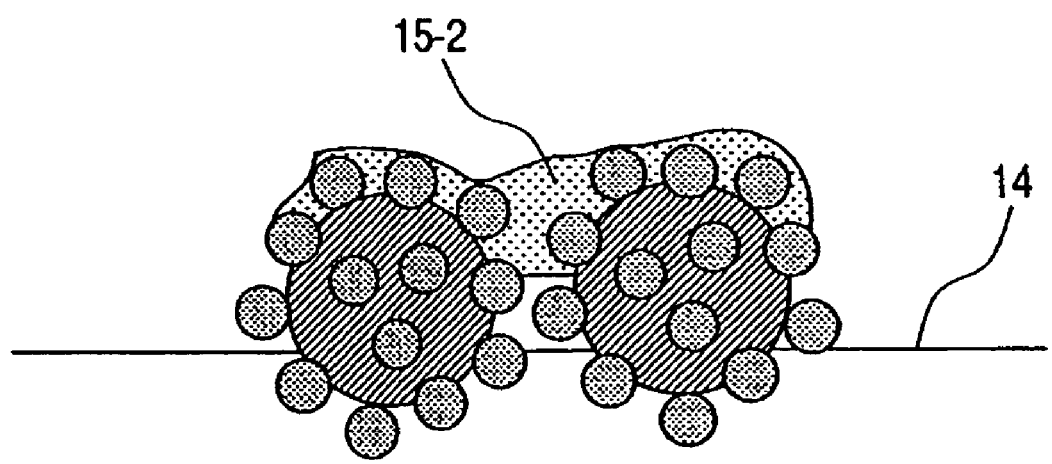

A water-soluble nonionic resin to be added to ink, which is another feature of the ink in accordance with the present invention, will be described. As the water-soluble nonionic resin to be used in the present invention, it is preferable to use a copolymer of any such nonionic hydrophobic monomer and any such nonionic hydrophilic monomer as listed above. That is, the nonionic hydrophobic monomer is used as a constituent of a resin, whereby high fixability of the dispersible colorant onto recording paper is obtained. On the other hand, when the nonionic hydrophilic monomer is used as a constituent of a resin, the resin can be made water-soluble, a water-soluble nonionic resin 15-1 can be allowed to penetrate well between colorant particles on recording paper (see FIG. 7A) to fill in a gap between the colorants, and the water-soluble nonionic resin that has penetrated between the colorants forms a resin film 15-2 (see FIG. 7B) to provide a recorded image with smoothness. That is, by allowing a water-soluble nonionic resin having such constitution to fill in gaps between colorants on recording paper to form a film and making the surface of a recorded image smooth, the glossiness of an image can be improved.

Examples of the water-soluble nonionic resin that can be suitably used in the present invention include: a polymer of monomers containing an alkylene oxide group; and a copolymer of a monomer containing an alkylene oxide group or vinyl alcohol and styrene or methyl methacrylate. In particular, the suitable copolymer includes a (40 to 70)/(60 to 30) copolymer of styrene/$CH_2$=$C(R_1)COOR_2$, wherein $R_1$ is H or $CH_3$, $R_2$ is —$(CH_2CH_2O)_n$—$R_3$ (n=1 to 30), and $R_3$ is H or $CH_3$.

In contrast, it is not preferable to incorporate into an ink a water-soluble chargeable resin obtained through copolymerization using an anionic or cationic monomer instead of the nonionic hydrophilic monomer because of the following reason. When the chargeable resin pseudo fine particles of a dispersible colorant and the water-soluble chargeable resin are electrically contradictory to each other, that is, when the chargeable resin pseudo fine particles are anionic and the water-soluble chargeable resin is cationic or when the chargeable fine particles are cationic and the water-soluble chargeable resin is anionic, the ions of the dispersible colorant and the ions of the water-soluble chargeable resin may bind to agglomerate, thereby losing dispersibility. On the other hand, when the chargeable resin pseudo fine particles of the dispersible colorant and the water-soluble chargeable resin are electrically identical to each other, the water-soluble chargeable resin becomes difficult to remain in gaps between the dispersible colorants, so that the effect of improving the glossiness of a recorded image may decreases. Accordingly, it is more preferable to use a nonionic hydrophilic monomer.

The water-soluble nonionic resin to be used in the present invention has a weight average molecular weight Mw of preferably 1,000 to 100,000, more preferably 2,000 to 30,000, and most preferably 2,000 to 10,000. A weight average molecular weight within the range can provide fluidity for imparting smoothness to a recorded image. Furthermore, the content of the water-soluble nonionic resin in ink is desirably 1 mass % or more because smoothness can be imparted to a recorded image. Furthermore, although there is no particular upper limit for the content of the water-soluble nonionic resin in ink, the content is preferably 10 mass % or less because a content exceeding 10 mass % may increase the viscosity of the ink to thereby lose fluidity for imparting smoothness to a recorded image.

(Emulsion Particles)

For an emulsion particle which is another feature of the present invention, those synthesized by a conventionally known method or those synthesized by the above-described method with a colorant being omitted can be used without any problem. However, the emulsion particle is preferably electrically identical to the chargeable fine particles of the dispersible colorant or nonionic. That is, when the chargeable fine particles are anionic, the emulsion particles are preferably anionic, while when the chargeable fine particles are cationic, the emulsion particles are preferably cationic. When the emulsion particles and the chargeable fine particles are electrically contradictory to each other, the ions of the dispersible colorant and the ions of the emulsion particles may bind to agglomerate, thereby losing dispersibility. Therefore, the emulsion particles need to be electrically identical to the chargeable fine particles of the dispersible colorant or to be nonionic.

In addition, it is preferable that the emulsion particles have an average particle diameter of 10 nm to 80 nm in an aqueous ink. When the average particle diameter is larger than 10 nm, the emulsion particles can remain on a recording medium without penetrating into the recording medium, and fill in gaps between the dispersible colorant particles, so that smoothness can be imparted to an image and the glossiness of the image can be improved. On the other hand, when the average particle diameter of the emulsion particles exceeds 80 nm, the emulsion particles are stacked on a dispersible colorant rather than filling in a gap between the dispersible colorants, so that an additional gap may be formed to lose smoothness.

Furthermore, it is preferable that the glass transition temperature (Tg) of the emulsion particle is −40° C. or more and 60° C. or less. When the glass transition temperature is within the range, a film is formed in a gap between a dispersible colorant and another dispersible colorant, so that smoothness and a film strength are imparted to the surface of a recorded image and hence either one of the glossiness and the rubfastness of the recorded image can be improved. At this time, the following three representative effects appear depending on the glass transition temperature (Tg) of the emulsion particle; provided, however, that a composite system of these effects can be selected by adding emulsion particles different from each other in Tg.

Figure 8A:
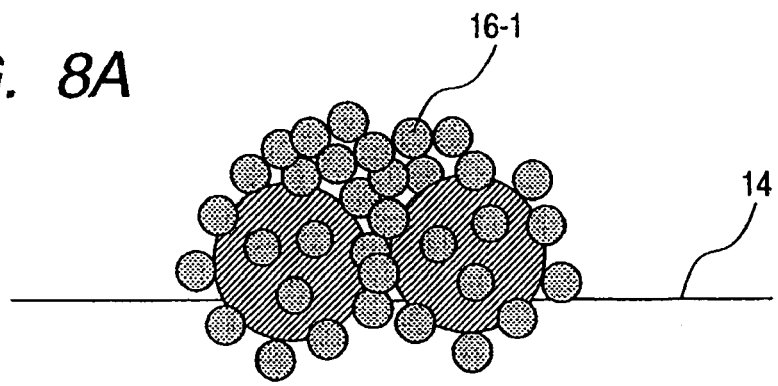
FIGS. 8A, 8B, 8C, and 8D are schematic views showing how an emulsion particle forms a film at a gap between dispersible colorants on a recording medium.
Figure 8B:
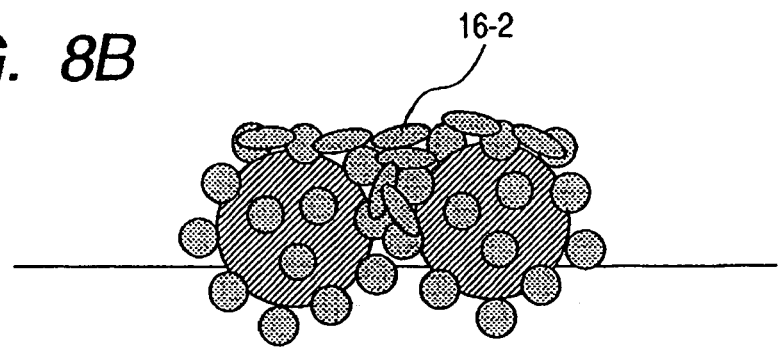
Figure 8C:
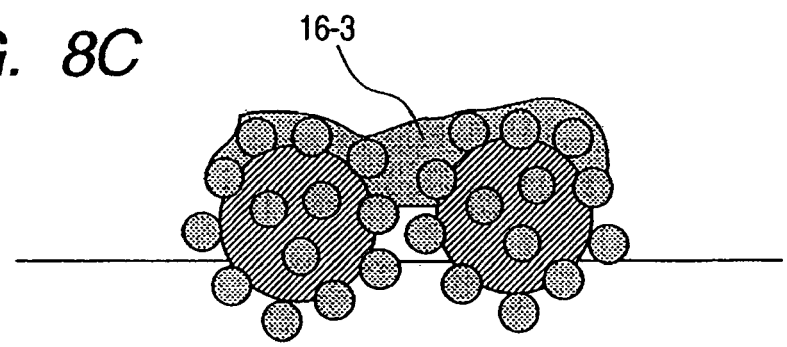
Figure 8D:
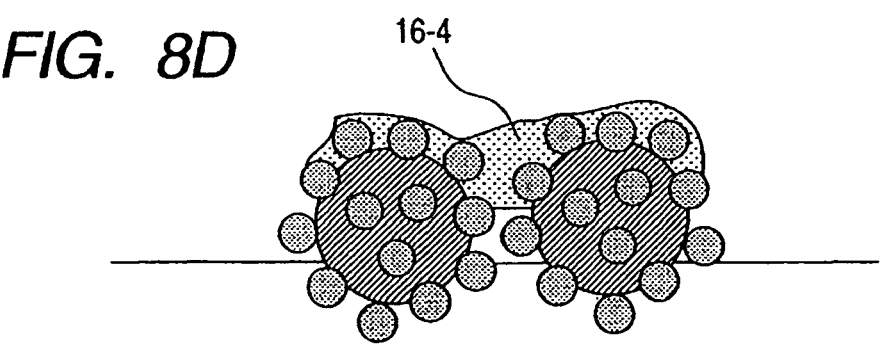

A first effect in which emulsion particles 16-1 dispersed in particle states in an aqueous ink are stacked while maintaining their particle state at the time of formation of a recorded image, to thereby fill in a gap between a dispersible colorant and another dispersible colorant to form a film (see FIG. 8A); a second effect in which the emulsion particles dispersed in particle states in the aqueous ink are collapsed at the time of formation of a recorded image to fill in a gap between the emulsion particles stacked while maintaining states of particles 16-2 to form a film (see FIG. 8B); and a third effect in which the emulsion particles dispersed in particle states in the aqueous ink lose their particle states at the time of formation of a recorded image, so that emulsion 16-3 provided with fluidity flows into a remaining gap to fill in the gap to form a film 16-4 can be obtained (see FIGS. 8C and 8D). According to any one of the first to third effects, smoothness can be imparted to the surface of a recorded image by selecting Tg. When a composite of the effects is expected, smoothness can be synergistically imparted to the surface of a recorded image by selecting the range of Tg in the same manner or by mixing emulsion particles different from each other in Tg. An action of such emulsion particles as described above can improve the glossiness of a recorded image.

Such emulsion particles are commercially available as an aqueous adhesive composition or a lustering agent to be used for improving the glossiness of a printed matter or the like. For example, Japanese Patent Nos. 3350518 and 3339629 disclose an aqueous emulsion composed of a urethane resin. The aqueous emulsion can be produced by synthesizing a urethane resin in a solvent a predetermined amount of which can be dissolved into water (most preferably, methyl ethyl ketone or the like), neutralizing the resultant in an aqueous system, and distilling an organic solvent off with stirring. In addition, Japanese Patent Application Laid-Open No. H10-279879 discloses a method of producing an aqueous emulsion involving collectively or continuously supplying two or more kinds of monomer components to an aqueous system.

In the case of such aqueous emulsions, a monomer having an ionic functional group such as a hydroxyl group or a sulfone group needs to be incorporated into a resin for stable dispersion in an aqueous system. Therefore, a general emulsion polymerization or suspension polymerization method may not allow such monomers having an ionic functional group to be sufficiently incorporated into emulsion particles. To avoid this problem, the methods can be adopted which involve one of polymerizing a polymer having an ionic functional group and then distilling a polymerization solvent off, or one of subjecting a monomer having an ionic functional group and a hydrophobic monomer to an aqueous phase precipitation polymerization system, to produce an aqueous emulsion. Emulsion suitable for the present invention may be produced by means of any one of the above two methods, and the polymers constituting the emulsion may be any resin.

The content of the emulsion particles in an ink is desirably 0.1 mass % or more because smoothness can be imparted to a recorded image. Furthermore, although there is no particular upper limit for the content of the emulsion particles in ink, the content is preferably 10 mass % or less because a content in excess of 10 mass % may increase the viscosity of the ink to lose fluidity for imparting smoothness to a recorded image.

(Aqueous Ink)

The aqueous ink in accordance with the present invention is characterized by containing the dispersible colorant described above and at least one of a water-soluble nonionic resin and an emulsion particle. When a colorant to be used is a pigment, in general, the pigment content is 0.1 mass % or more and 20 mass % or less, preferably 0.3 mass % or more and 15 mass % or less on the basis of the total mass of the ink. Further, examples of the preferable aqueous medium include water and a mixed medium of water and a water-soluble organic solvent. Moreover, the aqueous ink may further contain a penetrating agent that helps the ink penetrate into a recording medium, a preservative, an antifungal agent, or the like.

As shown in FIGS. 1A and 1B, the dispersible colorant to be used in the present invention is present in the ink in a state in which the chargeable resin pseudo fine particles 2 fix to the surface of the colorant 1. Therefore, the colorant 1 fixes to a recording medium and adjacent colorants on the recording medium via the chargeable resin pseudo fine particles 2 fixing to the surface. Accordingly, a printed matter obtained by using the aqueous ink of the present invention has excellent rubfastness.

Furthermore, when a pigment is used as the colorant, setting a ratio of chargeable resin pseudo fine particles to a pigment (represented by (resin mass)/(pigment mass)=B/P) to fall within the range of 0.3 or more and 4.0 or less is preferable in improving the rubfastness of a printed matter to be formed by means of the colorant, which is a preferred embodiment. By setting the B/P ratio equal to or more than 0.3, it is possible to improve the adhesiveness between colorants and between a colorant and a recording medium, thereby providing a printed matter with excellent rubfastness. In particular, with an aqueous ink using a dispersible colorant having fixed thereto chargeable resin pseudo fine particles containing a resin component with a glass transition temperature of −40° C. or more and 60° C. or less, the film formability can be developed more effectively, whereby rubfastness on glossy paper can be highly improved. When the B/P ratio is much larger than 4.0, the ink consequently has a high viscosity, so that the ejection stability may be impaired when the ink is used for an ink jet recording apparatus. Further, because the amount of the resin is extremely large as compared to that of the colorant, the color development of the colorant on a recording medium is inhibited and a sufficient printing density is not obtained in some cases. Setting the value of the B/P ratio within the range of 0.3 or more and 4.0 or less provides an aqueous ink that has achieved compatibility between excellent rubfastness and ejection stability in an ink jet recording apparatus.

The term "resin mass" herein employed refers to the total amount of the chargeable resin pseudo fine particles in the ink in accordance with the present invention, and the total amount may also include the amount of resin components apparently strongly adsorbed to a pigment surface; provided, however, that the total amount does not include the amount of water-soluble resin component that can be easily separated from a pigment.

The value of the B/P ratio described above, which can generally be determined by means of differential thermogravimetry, is measured and calculated by means of a TGA/SDTA851 (trade name) manufactured by METTLER-TOLEDO International Inc. That is, in the present invention, the aqueous ink jet recording ink in accordance with the present invention containing a water-soluble nonionic resin and a dispersible colorant was centrifuged at 80,000 rpm for 2 hours, and the precipitate was dried, weighed and subjected to a temperature rise in a nitrogen atmosphere or ambient air. A change in mass before and after the decomposition temperature of each of the pigment and the resin component at the time of the temperature rise was determined to calculate the B/P ratio. On the other hand, the aqueous ink jet recording ink containing an emulsion and a dispersible colorant was centrifuged at 25,000 rpm for 3 hours, and the precipitate was dried, weighed and subjected to temperature rise in a nitrogen atmosphere or ambient air. A change in mass before and after the decomposition temperature of each of the pigment and the resin component at the time of the temperature rise was determined to calculate the B/P ratio.

(Recorded Image)

The ink in accordance with the present invention can be suitably used for recording using an ink jet recording apparatus to be described later. A recording medium to be used at this time is not limited, and may be, for example, any medium that enables ink jet recording.

(Image Recording Method and Recording Apparatus)

The dispersible colorant used in the present invention and the aqueous ink containing the colorant can be used with ink jet ejection type heads. An ink in accordance with the invention may be housed in ink tanks and may also be utilized effectively to refill ink tanks. Particularly, the present invention provides advantages to the Bubble Jet® registered trade type recording heads and recording apparatus among various ink jet recording systems.

The representative structure and working principle are preferably based on the basic principle disclosed in U.S. Pat. Nos. 4,723,129 and 4,740,796. This principle is applicable to an on-demand or continuous type. It is particularly effective when applied to an on-demand type, where at least one driving signal is transmitted to an electrothermal converter placed in a position corresponding to each of a sheet and liquid passage by which the ink is held to rapidly heat the ink to a temperature beyond the nucleate boiling temperature, the converter being sufficiently generating heat to cause film boiling on the heated recording head surface, with the result that the bubbles are formed in the ink corresponding to the signal. The ink is ejected through an ejection port by the actions of the bubbles growing and contracting to form at least one droplet. The pulsed signal is more preferable, because it can immediately and adequately cause growth and contract of the bubbles to achieve ink eject of high response. U.S. Pat. Nos. 4,463,359 and 4,345,262 disclose the preferable pulsed signals. The recording can be performed more effectively under the conditions disclosed by U.S. Pat. No. 4,313,124 describes the temperature rising rate on the heat-working surface in the head.

The preferable head structures include combinations of ejection ports, liquid passages (linear or right angle to liquid passages) and electrothermal converters, as disclosed by the above U.S. patent specifications. The present invention is also effective in a structure with the components positioned on the curved heat-working surface, as disclosed by U.S. Pat. No. 4,558,333 or 4,459,600. It is also effective in another structure with plural 2 electrothermal converters sharing one or more common ink ejection ports and their own ejection ports, as disclosed by Japanese Patent Application Laid-Open No. S59-123670.

Further, a full-line type recording head, which covers a length corresponding to the maximum width over which the recording apparatus can produce images, may have a combination of a plurality of recording heads disclosed by the above specifications to cover the required length, or may be of such a structure that they are assembled in one body. The present invention helps these types exhibit the above-described effect more efficiently.

In addition, the present invention is also effective when fixed to an exchangeable chip type recording head body in which it can be electrically connected to the body to supply ink therefrom, and also to a cartridge type in which it is integrally mounted on the recording head itself. Moreover, the present invention can exhibit its effect more efficiently, when provided, as one component to the recording head, with a recovery unit or another auxiliary means, which is still another advantage of the present invention. More specifically, these include capping, cleaning and pressurizing or inducing means, electrothermal converter or another heating device, preliminary heating means comprising a combination of these devices, and a combination of these devices for a preliminary eject mode which is not for recording.

EXAMPLES

The present invention will be described in more detail with reference to EXAMPLES and COMPARATIVE EXAMPLES, which by no means limit the present invention, and various modifications may be made so long as they are within the scope of the present invention. In the following description the terms "parts" and "%" refer to parts by mass and percent by mass (mass %), respectively unless otherwise noted.

Example 1-1

A recording ink 1-1 in accordance with Example 1-1 was prepared according to the following procedure. First, a mixed liquid composed of 10 parts of carbon black, 6 parts of glycerin, 10 parts of a styrene/acrylic acid type resin dispersant, and 74 parts of water was dispersed by means of a sand mill manufactured by KANEDA SCIENTIFIC CO., LTD. at 1,500 rpm for 5 hours to prepare a pigment dispersion liquid 1. Zirconia beads of a diameter of 0.6 mm were used in the sand mill, and accounted for 70% of the pot. The carbon black used in this example was Black Pearls 880 (trade name) (hereinafter, abbreviated as BP880) available from Cabot Corporation in the United States, and the styrene/acrylic acid type resin dispersant having a copolymerization ratio of 70:30, an Mw of 8,000, and an acid value of 170 was used. Such styrene/acrylic acid type resin dispersant was used by adding water and potassium hydroxide of a quantity equivalent to the above acid value and stirring the mixture at 80° C. to prepare an aqueous solution. The obtained pigment dispersion liquid 1-1 was in a stably dispersed state with an average dispersion particle diameter of 98 nm and the polydispersity index was 0.16.

Next, while 100 parts of the pigment dispersion liquid 1-1 thus obtained were heated to 70° C. under a nitrogen atmosphere and stirred by means of a motor, the following three liquids were charged into a titration apparatus and added dropwise to perform polymerization for 6 hours: (1) 5.5 parts of methyl methacrylate, (2) 0.5 part of acrylic acid, 0.25 part of potassium hydroxide, and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours for purification, thereby resulting in a dispersible colorant 1-1 as a precipitate.

The dispersible colorant 1-1 was dispersed into water, and the dispersion liquid was centrifuged at 12,000 rpm for 60 minutes. The precipitate was redispersed into water and the redispersion liquid was dried and observed with a scanning electron microscope JSM-6700 (trade name; manufactured by JEOL HIGHTECH CO., LTD.) at a magnification of 50,000×. As a result, the dispersible colorant 1-1 was observed to have chargeable resin pseudo fine particles smaller than carbon black as a colorant fixed to the surface of the carbon black. Incidentally, the shapes of dispersible colorants prepared in the following examples were also observed in the same manner as described above.

The recording ink 1-1 of this example was prepared by: mixing the following components in such a manner that the ink contained the dispersible colorant 1-1 thus produced at a concentration of 4%; and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name: manufactured by Kawaken Fine Chemicals Co., Ltd.) | 0.25 part |
| 40/60 copolymer of styrene/$CH_2$=$C(R_1)COOR_2$ (manufactured by SEIKO POLYMER CORPORATION; weight average molecular weight Mw = 6,898) (In the above formula, $R_1$ is $CH_3$ and $R_2$ is —$(CH_2CH_2O)_{23}$—$R_3$ in which $R_3$ is $CH_3$) | 4 parts |
| Ion-exchanged water | Balance |

Example 1-2

While 100 parts of the pigment dispersion liquid 1-1 produced in Example 1-1 were heated to 70° C. under a nitrogen atmosphere and stirred by means of a motor, the following three liquids were charged into a titration apparatus and added dropwise to perform polymerization for 6 hours: (1) 4.5 parts of benzyl methacrylate and 1.2 parts of butyl acrylate, (2) 0.3 part of acrylic acid, 0.15 part of potassium hydroxide, and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours for purification, thereby resulting in a dispersible colorant 1-2 as a precipitate.

The recording ink 1-2 of this example was prepared by: mixing the following components in such a manner that the ink contained the dispersible colorant 1-2 thus produced at a concentration of 4%; and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name: manufactured by Kawaken Fine Chemicals Co., Ltd.) | 0.25 part |
| 60/40 copolymer of styrene/$CH_2$=$C(R_1)COOR_2$ (manufactured by SEIKO POLYMER CORPORATION; weight average molecular weight Mw = 7,213) (In the above formula, $R_1$ is $CH_3$, $R_2$ is —$(CH_2CH_2O)_{23}$—$R_3$ in which $R_3$ is $CH_3$) | 1 part |
| Ion-exchanged water | Balance |

Example 1-3

A recording ink 1-3 in accordance with this example was prepared according to the following procedure. First, a mixed liquid of 10 parts of Pigment Red (PR) (manufactured by Ciba Specialty Chemicals; CROMOPHTAL MAZENTA DMQ (trade name)) as a colorant, 6 parts of glycerin, 10 parts of a styrene/acrylic acid type dispersant, and 74 parts of water was dispersed by means of a sand mill manufactured by KANEDA SCIENTIFIC CO., LTD. at 1,500 rpm for 5 hours to prepare a pigment dispersion liquid 5. Zirconia beads of a diameter of 0.6 mm were used in the sand mill, and accounted for 70% of the pot. The styrene-acrylic resin as a dispersant having a copolymerization ratio of 70:30, an Mw of 8,000, and an acid value of 170 was used. The obtained pigment dispersion liquid 1-3 was in a stably dispersed state with an average dispersion particle diameter of 88 nm and the polydispersity index was 0.13.

Next, while 100 parts of the pigment dispersion liquid 1-3 were heated to 70° C. under a nitrogen atmosphere and stirred by means of a motor, the following three liquids were charged into a titration apparatus and added dropwise to perform polymerization for 6 hours: (1) 5.7 parts of styrene, (2) 0.3 part of acrylic acid, 0.15 part of potassium hydroxide, and 20 parts of water, and (3) 0.05 part of VA057 (trade name; manufactured by Wako Pure Chemical Industries, Ltd.; 2,2'-azobis(N-(2-carboxyethyl)amidinopropane)) and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 1-3 as a precipitate.

The recording ink 1-3 of this example was prepared by: mixing the following components in such a manner that the ink contained the dispersible colorant 1-3 thus produced at a concentration of 4%; and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name: manufactured by Kawaken Fine Chemicals Co., Ltd.) | 0.25 part |
| 60/40 copolymer of styrene/vinyl alcohol (manufactured by SEIKO POLYMER CORPORATION; weight average molecular weight Mw = 4,030) | 3.0 parts |
| Ion-exchanged water | Balance |

Example 1-4

A recording ink 1-4 in accordance with this example was prepared according to the following procedure. First, a mixed liquid of 10 parts of FAST YELLOW 7413 (trade name) (Pigment Yellow 74; manufactured by Sanyo Color Works, Ltd.) as a colorant, 6 parts of glycerin, 10 parts of a styrene/dimethylaminoethyl acrylate type dispersant, and 74 parts of water was dispersed by means of a sand mill manufactured by KANEDA SCIENTIFIC CO., LTD. at 1,500 rpm for 5 hours to prepare a pigment dispersion liquid 1-4. Zirconia beads of a diameter of 0.6 mm were used in the sand mill, and accounted for 70% of the pot. The styrene/dimethylaminoethyl acrylate resin copolymerized cationic dispersion resin having a copolymerization ratio of 70:30, an Mw of 8,000, and an amine value of 170 was used. Such dispersion resin was used by adding water and acetic acid of a quantity slightly in excess of the amine value, and stirring the mixture at 80° C. to prepare an aqueous solution. The obtained pigment dispersion liquid 1-1 was in a stably dispersed state with an average dispersion particle diameter of 111 nm and the polydispersity index was 0.16.

Next, while 100 parts of the pigment dispersion liquid 1-4 thus obtained were heated to 70° C. under a nitrogen atmosphere and stirred by means of a motor, the following three liquids were charged into a titration apparatus and added dropwise to perform polymerization for 6 hours: (1) 4.2 parts of benzyl methacrylate, (2) 1.8 parts of dimethylaminoethyl acrylate and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 1-4 as a precipitate.

The recording ink 1-4 of this example was prepared by mixing the following components in such a manner that the ink contained the dispersible colorant 1-4 thus produced at a concentration of 4%; and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |
| 70/30 copolymer of methyl | 4 parts |

-continued

| | |
|---|---|
| methacrylate/CH$_2$=C(R$_1$)COOR$_2$ (manufactured by SEIKO POLYMER CORPORATION; weight average molecular weight Mw = 7,398) (In the above formula, R$_1$ is CH$_3$, R$_2$ is —(CH$_2$CH$_2$O)$_9$—R$_3$ in which R$_3$ is CH$_3$) | |
| Ion-exchanged water | Balance |

Comparative Example 1-1

A recording ink 1-1 of this comparative example was prepared by mixing the following components in such a manner that the ink contained the dispersible colorant 1-1 thus produced at a concentration of 4%, and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |
| Ion-exchanged water | Balance |

Comparative Example 1-2

A recording ink 1-2 of this example containing a water-soluble anionic resin was prepared by mixing the following components in such a manner that the ink contained the dispersible colorant 1-2 thus produced at a concentration of 4%, and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |
| 70/30 copolymer of styrene/acrylic acid (manufactured by SEIKO POLYMER CORPORATION; weight average molecular weight Mw = 9,053) | 5 parts |
| Ion-exchanged water | Balance |

Comparative Example 1-3

A recording ink 1-3 of this example was prepared by mixing the following components in such a manner that the ink contained the dispersible colorant 1-3 thus produced at a concentration of 4%, and filtering the mixture through a membrane filter having a pore size of 2.5 micron under pressure. The total amount of the ink was adjusted with water to be 100 parts.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |

-continued

| | |
|---|---|
| 70/30 copolymer of styrene/dimethylaminoethyl acrylate (manufactured by SEIKO POLYMER CORPORATION; weight average molecular weight Mw = 7,690) | 4 parts |
| Ion-exchanged water | Balance |

(Characteristics of Dispersible Colorants)

Each of the dispersible colorants produced in Examples 1-1 to 1-4 was observed by means of the method described below and measured for various physical properties. Incidentally, the glass transition temperature (Tg) of the chargeable resin pseudo fine particles was measured according to the following procedure. A dispersible colorant was subjected to acid precipitation with hydrochloric acid. Then, the solid content produced by the acid precipitation was subjected to Soxhlet extraction with tetrahydrofuran (THF), and THF was distilled off to produce chargeable resin pseudo fine particle component. Furthermore, Tg of the resultant chargeable resin pseudo fine particle component was measured by means of a differential scanning calorimetry using DSC 822e (trade name) manufactured by METTLER-TOLEDO International Inc.). An aqueous dispersion liquid in which a dispersible colorant and a water-soluble nonionic resin or emulsion coexist can be separated by means of a centrifuge. Table 1-1 shows the obtained results.

<Fixing Ability of Resin Fine Particles>

Each dispersible colorant was dispersed into water, and the dispersion liquid was dried. The resultant was observed with a scanning electron microscope JSM-6700 (trade name; manufactured by JEOL HIGHTECH CO., LTD.) at a magnification of 50,000×. The state of fixing of the resin fine particles to the colorant and the properties of the fixing resin fine particles were evaluated as follows.

○: The fixing of resin fine particles was observed.

×: The fixing of resin fine particles could not be observed.

<Dispersion Stability>

A 5% aqueous dispersion liquid of each of the dispersible colorants was diluted to 10 times volume with pure water and then concentrated by means of an ultrafiltration filter with a cutoff molecular weight of 50,000 to the original concentration. The concentrate was subjected to a separation process using a centrifuge under the conditions of 12,000 rpm for 2 hours. Then, the precipitate as separated was taken out and redispersed in pure water. The resultant dispersion liquid was checked as to whether the condition that the precipitate was confirmed by visual observation to be dispersed well and the average particle diameter measured by a dynamic light scattering method described below was not more than twice the particle diameter before the processing. The result was evaluated as follows.

○: The condition was satisfied.

×: The condition was not satisfied.

<Long-term Storage Stability>

Each dispersible colorant in a state of a dispersion aqueous solution was charged into a sample bottle made of glass, and the bottle was left standing in a sealed state at 60° C. for 1 month. After that, the dispersed state was visually observed. The evaluation criteria for long-term storage stability are as follows.

○: Solid content neither agglomerated nor precipitated.

Δ: Precipitation of solid content is slightly observed, but original uniform dispersion state is recovered by slightly shaking.

x: Agglomeration/precipitation of solid content is observed, and uniformity is not obtained even when shaken slightly.

<Average Particle Diameter>

Each of the dispersible colorants was measured by a dynamic light scattering method, using ELS-800 (trade name; available from OTSUKA ELECTRONICS CO., LTD.), and a cumulant average of the measured particle diameters was defined as an average particle diameter of the colorant.

<Surface Functional Group Density>

The surface functional group density of each dispersible colorant was determined by the following procedure. The aqueous dispersion of the dispersible colorant was diluted with a highly excessive amount of an aqueous HCl solution, and centrifugally treated at 20,000 rpm for 1 hour. The resulting precipitate was redispersed in pure water, and its solid content was determined. The precipitate was weighed and then a known amount of sodium hydrogencarbonate was added thereto, followed by stirring to prepare a dispersion liquid, which was further centrifugally treated at 80,000 rpm for 2 hours for precipitation. The supernatant solution was weighed, and titrated with a 0.1 N aqueous HCl solution for neutralization to determine the surface functional group density by subtracting the known sodium hydrogencarbonate amount and a blank value with pure water from the amount for neutralization.

TABLE 1-1

Characteristics of Dispersible Colorants

|  | Dispersible colorant 1-1 | Dispersible colorant 1-2 | Dispersible colorant 1-3 | Dispersible colorant 1-4 |
|---|---|---|---|---|
| Tg of chargeable fine particles (° C.) | 105 | 30 | 110 | 115 |
| Fixing state | ○ | ○ | ○ | ○ |
| Dispersion stability | ○ | ○ | ○ | ○ |
| Long-term storage stability | ○ | ○ | ○ | ○ |
| Particle diameter (nm) | 125 | 125 | 115 | 120 |
| Surface functional group density (μmol/g) | 420 | 260 | 255 | 250 |

(Method of Evaluating Aqueous Ink for Ink Jet Recording and Results of Evaluation)

Each of the recording inks thus prepared was used to perform printing on a glossy recording medium by means of an ink jet recording apparatus, and the resultant image was evaluated. A BJ S600 (trade name) available from CANON Inc. was used as the ink jet recording apparatus, and glossy paper for ink jet recording PR-101 (trade name) available from CANON Inc. was used as the recording medium. A 5 cm-square solid patch was printed on the glossy paper, and was evaluated for glossiness and rubfastness (fixability). Table 1-2 shows the results.

<Glossiness>

The glossiness of a printed matter was measured by means of a Maicrohazemater (trade name; manufactured by BYK Gardner) and evaluated according to the following criteria.

A: The gloss value (20° gloss) is 50 or more.

B: The gloss value (20° gloss) is 40 or more and less than 50.

C: The gloss value (20° gloss) is 30 or more and less than 40.

D: The gloss value (200 gloss) is 20 or more and less than 30.

<Rubfastness (Fixability)>

A printed matter was evaluated for rubfastness as follows. A printed portion was rubbed three times with silbon paper to under application of a load of 40 g/cm². The degree to which an image portion was shaved was visually observed and evaluated according to the following criteria.

A: An image is partly rubbed away, but 90% or more of a printed portion remains.

B: An image is partly rubbed way, but 70% or more of a printed portion remains.

C: An image is greatly rubbed away.

TABLE 1-2

Ink Compositions and Results of Evaluation of Formed Image

| | Recording ink Added resin | | | Results of evaluation Of image | |
|---|---|---|---|---|---|
| | Kind | Addition amount (%) | Average molecular weight | Glossiness | Rubfastness |
| Example 1-1 | Water-soluble nonionic | 4.0 | 6896 | A | A |
| Example 1-2 | Water-soluble nonionic | 1.0 | 7213 | B | A |
| Example 1-3 | Water-soluble nonionic | 3.0 | 4030 | A | B |
| Example 1-4 | Water-soluble nonionic | 4.0 | 7398 | A | A |
| Comparative Example 1-1 | — | 0 | — | C | B |
| Comparative Example 1-2 | Water-soluble nonionic | 4.0 | 9053 | C | B |
| Comparative Example 1-3 | Water-soluble nonionic | 4.0 | 7690 | C | B |

Next, examples involving the use of emulsion particles will be given.

<Preparation of Dispersible Colorant>

(Dispersible Colorant 2-1)

First, a mixed liquid of 10 parts of Pigment Blue (PB) 15:3 (manufactured by Ciba Specialty Chemicals; IRIGALITE BLUE 8700 (trade name)), 6 parts of glycerin, 10 parts of a styrene/acrylic acid type resin dispersant, and 74 parts of water was dispersed by means of a sand mill manufactured by KANEDA SCIENTIFIC CO., LTD. at 1,500 rpm for 5 hours to prepare a pigment dispersion liquid 2-1. Zirconia beads having a diameter of 0.6 mm were used in the sand mill, and accounted for 70% of the pot. The styrene/acrylic acid type resin dispersant having a copolymerization ratio of 70:30, an Mw of 8,000, and an acid value of 170 was used. Such styrene/acrylic acid type resin dispersant was used by adding water and potassium hydroxide of a quantity equivalent to the above acid value, and stirring the mixture at 80° C. to prepare an aqueous solution. The obtained pigment dispersion liquid 2-1 was in a stably dispersed state with an average dispersion particle diameter of 110 nm and the polydispersity index was 0.16.

Next, while 100 parts of the pigment dispersion liquid 2-1 thus obtained were heated to 70° C. under a nitrogen atmosphere and stirred by means of a motor, the following three liquids were charged into a titration apparatus and added dropwise to perform polymerization for 6 hours: (1) 5.5 parts of methyl methacrylate, (2) 0.5 part of acrylic acid, 0.25 part of potassium hydroxide, and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours for purification, thereby resulting in a dispersible colorant 2-1 as a precipitate.

The dispersible colorant 2-1 was dispersed into water, and the dispersion liquid was centrifuged at 12,000 rpm for 60 minutes. The precipitate was redispersed into water and the redispersion liquid was dried and observed with a scanning electron microscope JSM-6700 (trade name; manufactured by JEOL HIGHTECH CO., LTD.) at a magnification of 50,000×. As a result, the dispersible colorant 2-1 was observed to have chargeable resin pseudo fine particles smaller than carbon black as a colorant fixed to the surface of the carbon black. Incidentally, the shapes of dispersible colorants prepared in the following examples were also observed in the same manner as described above.

(Dispersible Colorant 2-2)

While 100 parts of the pigment dispersion liquid 2-1 thus obtained were heated to 70° C. under a nitrogen atmosphere and stirred by means of a motor, the following three liquids were charged into a titration apparatus and added dropwise to perform polymerization for 6 hours: (1) 4.5 parts of benzyl methacrylate and 1.2 parts of butyl acrylate, (2) 0.3 part of acrylic acid, 0.15 part of potassium hydroxide, and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 2-2 as a precipitate.

(Dispersible Colorant 2-3)

While 100 parts of the pigment dispersion liquid 2-1 thus obtained were heated to 70° C. under a nitrogen atmosphere and stirred by means of a motor, the following three liquids were charged into a titration apparatus and added dropwise to perform polymerization for 6 hours: (1) 5.0 parts of benzyl methacrylate and 0.7 part of butyl acrylate, (2) 0.3 part of acrylic acid, 0.15 part of potassium hydroxide, and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 2-3 as a precipitate.

(Dispersible Colorant 2-4)

While 100 parts of the pigment dispersion liquid 2-1 thus obtained were heated to 70° C. under a nitrogen atmosphere and stirred by means of a motor, the following three liquids were charged into a titration apparatus and added dropwise to perform polymerization for 6 hours: (1) 5.0 parts of butyl acrylate and 0.7 part of benzyl methacrylate, (2) 1.8 parts of dimethylaminoethyl acrylate and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 2-4 as a precipitate.

(Dispersible Colorant 2-5)

While 100 parts of the pigment dispersion liquid 2-1 thus obtained were heated to 70° C. under a nitrogen atmosphere and stirred by means of a motor, the following three liquids were charged into a titration apparatus and added dropwise to perform polymerization for 6 hours: (1) 5.7 parts of butyl acrylate, (2) 1.8 parts of dimethylaminoethyl acrylate and 20 parts of water, and (3) 0.05 part of potassium persulfate and 20 parts of water.

The resultant dispersion liquid was diluted to 10 times volume with water, and centrifuged at 5,000 rpm for 10 minutes to remove agglomerated components. After that, the remainder was additionally centrifuged at 12,500 rpm for 2 hours, thereby resulting in a dispersible colorant 2-5 as a precipitate.

<Preparation of Emulsion Particles>

(Emulsion Particles 1)

Emulsion particles 1 were prepared according to the following procedure. While 100 parts of a 2% aqueous solution of the styrene/acrylic acid type resin dispersant were heated to 70° C. under a nitrogen atmosphere and stirred by means of a motor, the following three liquids were charged into a titration apparatus and added dropwise to perform polymerization for 6 hours: (1) 5.5 parts of methyl methacrylate, (2) 0.5 part of acrylic acid, 0.25 part of potassium hydroxide, and 20 parts of water, and (3) 0.05 part of potassium persulfate and 20 parts of water.

The resultant dispersion liquid was centrifuged at 80,000 rpm for 2 hours for purification, thereby giving emulsion particles 1 as a precipitate. The emulsion particles 1 had an average dispersion particle diameter of 20 nm.

(Emulsion Particles 2)

Emulsion particles 2 were prepared in the same manner as in the preparation of the emulsion particles 1 with the exception that 4.5 parts of benzyl methacrylate and 1.0 part of butyl acrylate were used instead of 5.5 parts of methyl methacrylate.

(Emulsion Particles 3)

Emulsion particles 3 were prepared in the same manner as in the preparation of the emulsion 1 with the exception that 0.7 part of benzyl methacrylate and 4.8 parts of butyl acrylate were used instead of 5.5 parts of methyl methacrylate.

(Emulsion Particles 4)

Emulsion particles 4 were prepared in the same manner as in the preparation of the emulsion 1 with the exception that 5.0 parts of benzyl methacrylate and 0.5 parts of butyl acrylate were used instead of 5.5 parts of methyl methacrylate.

(Emulsion Particles 5)

Emulsion particles 5 were prepared in the same manner as in the preparation of the emulsion 1 with the exception that 5.5 parts of butyl acrylate were used instead of 5.5 parts of methyl methacrylate.

(Emulsion Particles 6 and 7)

While 100 parts of pure water were heated to 70° C. in a nitrogen atmosphere, the following three liquids were charged into a titration apparatus and added dropwise with stirring by means of a motor to perform polymerization for 6 hours: (1) 4.5 parts of benzyl methacrylate and 1 part of butyl acrylate, (2) 0.5 part of acrylic acid, 0.25 part of potassium hydroxide, and 20 parts of water, and (3) 0.05 part of potassium persulfate and 20 parts of water.

The resultant dispersion liquid was centrifuged for classification to thereby give emulsion particles 6 and 7. The emulsion particles 6 had an average dispersion particle diameter of 80 nm and the emulsion particles 7 had an average dispersion particle diameter of 120 nm.

(Emulsion Particles 8)

Emulsion particles 8 were prepared according to the following procedure. While 100 parts of a 2% aqueous solution of the styrene/dimethylaminoethyl acrylate type resin dispersant were heated to 70° C. in a nitrogen atmosphere, the following three liquids were charged into a titration apparatus and added dropwise with stirring by means of a motor to perform polymerization for 6 hours: (1) 4.5 parts of butyl acrylate and 1.2 parts of benzyl methacrylate, (2) 1.8 parts of dimethylaminoethyl acrylate and 20 parts of water, and (3) 0.05 part of potassium persulfate and 20 parts of water.

The resultant dispersion liquid was centrifuged at 80,000 rpm for 2 hours for purification to thereby give emulsion particles 8 as a precipitate. The emulsion particles 8 had an average dispersion particle diameter of 60 nm.

Example 2-1

A recording ink 2-1 in accordance with Example 2-1 was prepared according to the following procedure. The following components were mixed in such a manner that the ink contained the dispersible colorant 2-2 at a concentration of 4%. Then, the mixture was filtered through a membrane filter having a pore size of 2.5 micron under pressure, to thereby prepare the recording ink 2-1 of this example.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |
| Emulsion particles 1 | 4 parts |
| Ion-exchanged water | Balance |

(Amount Attaining Total Amount of 100 Parts)

Example 2-2

A recording ink 2-2 was prepared in the same manner as in Example 1 with the exception that the emulsion particles 2 were used instead of the emulsion particles 1.

Example 2-3

A recording ink 2-3 was prepared in the same manner as in Example 1 with the exception that the emulsion particles 3 were used instead of the emulsion particles 1.

Example 2-4

A recording ink 2-4 was prepared in the same manner as in Example 1 with the exception that the emulsion particles 4 were used instead of the emulsion particles 1.

Example 2-5

A recording ink 2-5 was prepared in the same manner as in Example 1 with the exception that the emulsion particles 5 were used instead of the emulsion particles 1.

Example 2-6

A recording ink 2-6 was prepared in the same manner as in Example 1 with the exception that 0.2 part of the emulsion particles 2 was used instead of 4 parts of the emulsion particles 1.

Example 2-7

A recording ink 2-7 was prepared in the same manner as in Example 1 with the exception that 0.2 part of the emulsion particles 6 was used instead of 4 parts of the emulsion particles 1.

Example 2-8

A recording ink 2-8 was prepared in the same manner as in Example 1 with the exception that 0.2 part of the emulsion particles 7 was used instead of 4 parts of the emulsion particles 1.

Example 2-9

A recording ink 2-9 was prepared in the same manner as in Example 1 with the exception that the colorant 2-5 was used instead of the dispersible colorant 2-2 and the emulsion particles 8 were used instead of the emulsion particles 1.

Example 2-10

A recording ink 2-10 was prepared in the same manner as in Example 2-6 with the exception that the dispersible colorant 2-1 was used instead of the dispersible colorant 2-2.

Example 2-11

A recording ink 2-11 was prepared in the same manner as in Example 2-6 with the exception that the dispersible colorant 2-3 was used instead of the dispersible colorant 2-2.

Example 2-12

A recording ink 2-12 was prepared in the same manner as in Example 2-6 with the exception that the dispersible colorant 2-4 was used instead of the dispersible colorant 2-2.

Comparative Example 2-1

The following components were mixed in such a manner that a recording ink of this comparative example contained the dispersible colorant 2-1 at a concentration of 4%. Then, the mixture was filtered through a membrane filter having a pore size of 2.5 micron under pressure, to thereby prepare the ink.

| | |
|---|---|
| Glycerin | 7 parts |
| Diethylene glycol | 5 parts |
| Trimethylolpropane | 5 parts |
| Acetylenol EH (trade name; manufactured by Kawaken Fine Chemicals Co., Ltd.) | 0.25 part |
| Ion-exchanged water | Balance |

(Amount Attaining a Total Amount of 100 Parts)

<<Characteristics of Dispersible Colorants>>

Each of the dispersible colorants was observed by means of the method described below and measured for various physical properties. Incidentally, the glass transition temperature (Tg) of the chargeable resin pseudo fine particles was measured according to the following procedure. A dispersible colorant was subjected to acid precipitation with hydrochloric acid. Then, the solid content produced by the acid precipitation was subjected to Soxhlet extraction with tetrahydrofuran (THF), and THF was distilled off to produce chargeable resin pseudo fine particle component. Furthermore, Tg of the resultant chargeable resin pseudo fine particle component was measured by means of a differential scanning calorimetry using DSC 822e (trade name) manufactured by METTLER-TOLEDO International Inc.). An aqueous dispersion liquid in which a dispersible colorant and a water-soluble nonionic resin or emulsion coexist can be separated by means of a centrifuge. Table 2-1 shows the obtained results.

<Fixing Ability of Resin Fine Particles>

Each dispersible colorant was dispersed into water, and the dispersion liquid was dried. The resultant was observed with a scanning electron microscope JSM-6700 (trade name; manufactured by JEOL HIGHTECH CO., LTD.) at a magnification of 50,000×. The state of fixing of the resin fine particles to the colorant and the properties of the fixing resin fine particles were evaluated as follows.

(Fixing State of Resin Fine Particles)
  ○: The fixing of resin fine particles was observed.
  ×: The fixing of resin fine particles could not be observed.

<Dispersion Stability>

A 5% aqueous dispersion liquid of each of the dispersible colorants was diluted to 10 times volume with pure water and then concentrated by means of an ultrafiltration filter with a cutoff molecular weight of 50,000 to the original concentration. The concentrate was subjected to a separation process using a centrifuge under the conditions of 12,000 rpm for 2 hours. Then, the precipitate as separated was taken out and redispersed in pure water. The resultant dispersion liquid was checked as to whether the condition that the precipitate was confirmed by visual observation to be dispersed well and the average particle diameter measured by a dynamic light scattering method described below was not more than twice the particle diameter before the processing. The result was evaluated as follows.
  ○: The condition was satisfied.
  ×: The condition was not satisfied.

<Long-term Storage Stability>

Each dispersible colorant in a state of a dispersion aqueous solution was charged into a sample bottle made of glass, and the bottle was left standing in a sealed state at 60° C. for 1 month. After that, the dispersed state was visually observed. The evaluation criteria for long-term storage stability are as follows.

○: Solid content neither agglomerated nor precipitated.
  Δ: Precipitation of solid content is slightly observed, but original uniform dispersion state is recovered by slightly shaking.
  ×: Agglomeration/precipitation of solid content is observed, and uniformity is not obtained even when shaken slightly.

<Average Particle Diameter>

Each of the dispersible colorants was measured by a dynamic light scattering method, using ELS-800 (trade name; available from OTSUKA ELECTRONICS CO., LTD.), and a cumulant average of the measured particle diameters was defined as an average particle diameter of the colorant.

<Surface Functional Group Density>

The surface functional group density of each dispersible colorant was determined by the following procedure. The aqueous dispersion of the dispersible colorant was diluted with a highly excessive amount of an aqueous HCl solution, and centrifugally treated at 20,000 rpm for 1 hour. The resulting precipitate was redispersed in pure water, and its solid content was determined. The precipitate was weighed and then a known amount of sodium hydrogencarbonate was added thereto, followed by stirring to prepare a dispersion liquid, which was further centrifugally treated at 80,000 rpm for 2 hours for precipitation. The supernatant solution was weighed, and titrated with a 0.1 N aqueous HCl solution for neutralization to determine the surface functional group density by subtracting the known sodium hydrogencarbonate amount and a blank value with pure water from the amount for neutralization. In the case where a colorant has an amine value, the surface functional group density can be determined by means of a known amount of an aqueous solution of hydrochloric acid and a 0.1N aqueous solution of potassium hydroxide instead of sodium hydrogen carbonate and a 0.1N aqueous solution of hydrochloric acid.

TABLE 2-1

Properties of Dispersible Colorant

| | Dispersible colorant 2-1 | Dispersible colorant 2-2 | Dispersible colorant 2-3 | Dispersible colorant 2-4 | Dispersible colorant 2-5 |
|---|---|---|---|---|---|
| Tg of chargeable fine particles (° C.) | 105 | 30 | 60 | −58 | −35 |
| Fixing state | ○ | ○ | ○ | ○ | ○ |
| Dispersion stability | ○ | ○ | ○ | ○ | ○ |
| Long-term storage stability | ○ | ○ | ○ | ○ | ○ |
| Particle diameter (nm) | 125 | 125 | 130 | 135 | 140 |
| Surface functional group density (μmol/g) | 420 | 260 | 255 | 290 | 260 |

<<Characteristics of Emulsion Particles>>

The average particle diameter of each of the emulsion particles thus prepared was measured by means of a particle diameter measuring device (FPAR 1000 (trade name) manufactured by Otsuka Electronics Co., Ltd.). The resultant emulsion aqueous dispersion liquid was evaporated to dryness, and the resultant was subjected to differential scanning calorimetry by means of a DSC 822e (trade name) manufactured by METTLER-TOLEDO International Inc., to measure the glass transition temperature of each of the emulsion particles. Table 2-2 shows the results.

TABLE 2-2

| Emulsion No. | Characteristics of Emulsion | |
|---|---|---|
| | Glass transition temperature (Tg) (° C.) | Particle diameter (nm) |
| 1 | 105 | 35 |
| 2 | 30 | 30 |
| 3 | −35 | 30 |
| 4 | 60 | 40 |
| 5 | −55 | 45 |
| 6 | 30 | 80 |
| 7 | 32 | 120 |
| 8 | 35 | 60 |

(Method of Evaluating Aqueous Ink for Ink Jet Recording and Results of Evaluation)

Each of the recording inks thus prepared in the examples and comparative examples was used to perform printing on a glossy recording medium by means of an ink jet recording apparatus, and the resultant image was evaluated. A BJ S600 (trade name) available from CANON Inc. was used as the ink jet recording apparatus, and glossy paper for ink jet recording PR-101 (trade name) available from CANON Inc. was used as the recording medium. A 5 cm-square solid patch was printed on the glossy paper, and was evaluated for glossiness and rubfastness (fixability). Tables 2-3 to 2-5 show the results.

<Glossiness>

The glossiness of a printed matter was measured by means of a Maicrohazemater (trade name; manufactured by BYK Gardner) and evaluated according to the following criteria.

A: The gloss value (20° gloss) is 50 or more.

B: The gloss value (20° gloss) is 40 or more and less than 50.

C: The gloss value (20° gloss) is 30 or more and less than 40.

D: The gloss value (20° gloss) is 20 or more and less than 30.

<Rubfastness (Fixability)>

A printed matter was evaluated for rubfastness as follows. A printed portion was rubbed three times with silbon paper to under application of a load of 40 g/cm². The degree to which an image portion was shaved was visually observed and evaluated according to the following criteria.

A: An image is partly rubbed away, but 90% or more of a printed portion remains.

B: An image is partly rubbed way, but 70% or more and less than 90% of a printed portion remains.

C: An image is greatly rubbed away (remained in less than 70%).

TABLE 2-3

| | Example 2-1 | Example 2-2 | Example 2-3 | Example 2-4 | Example 2-5 |
|---|---|---|---|---|---|
| Colorant No. | 2-2 | 2-2 | 2-2 | 2-2 | 2-2 |
| Emulsion particle No. | 1 | 2 | 3 | 4 | 5 |
| Amount (part) | 4 | 4 | 4 | 4 | 4 |
| Particle diameter (nm) | 35 | 30 | 30 | 40 | 45 |
| Tg (° C.) | 105 | 30 | −35 | 60 | −55 |
| Glossiness | B | A | A | A | A |
| Rubfastness | A | A | A | A | B |

TABLE 2-4

| | Example 2-6 | Example 2-7 | Example 2-8 | Example 2-9 | Example 2-10 |
|---|---|---|---|---|---|
| Colorant No. | 2-2 | 2-2 | 2-2 | 2-5 | 2-1 |
| Emulsion Particle No. | 2 | 6 | 7 | 8 | 2 |
| Amount (part) | 0.2 | 0.2 | 0.2 | 4 | 0.2 |
| Particle Diameter (nm) | 30 | 80 | 120 | 60 | 30 |
| Tg (° C.) | 30 | 32 | 35 | 35 | 30 |
| Glossiness | A | A | B | A | B |
| Rubfastness | A | A | A | A | A |

TABLE 2-5

| | Example 2-11 | Example 2-12 | Comparative Example 2-1 |
|---|---|---|---|
| Colorant No. | 2-3 | 2-4 | 2-1 |
| Emulsion Particle No. | 2 | 2 | — |
| Amount (part) | 0.2 | 0.2 | 0 |
| Particle diameter (nm) | 30 | 30 | — |
| Tg (° C.) | 30 | 30 | — |
| Glossiness | A | A | C |
| Rubfastness | A | B | B |

As can be seen from the above results, the use of an aqueous ink prepared by adding an emulsion to a dispersible colorant improved glossiness and rubfastness. Furthermore, the use of an emulsion having a glass transition temperature within the range of −40° C. to 60° C. or of emulsion particles having an average particle diameter within the range of 10 nm to 80 nm additionally improved at least one of glossiness and rubfastness.

According to the present invention, there is provided an aqueous ink suitable for ink jet recording, which has high dispersion stability, is in long-term dispersion stability, and is capable of providing an image (especially a highly glossy image) excellent in fastness such as rubfastness. According to the present invention, there are also provided an ink tank, an ink jet recording apparatus, an ink jet recording method, and an ink jet recorded image each using such excellent aqueous ink.

This application claims priority from Japanese Patent Application No. 2004-189033 filed Jun. 25, 2004 and Japanese Patent Application No. 2004-190287 filed Jun. 28, 2004, which are hereby incorporated by reference herein.

What is claimed is:

1. An aqueous ink comprising:
   a dispersible colorant comprising a colorant and a chargeable resin pseudo fine particle smaller than the colorant, the colorant and the chargeable resin pseudo fine particle fixing to each other; and
   at least one of a water-soluble nonionic resin and an emulsion particle.

2. The aqueous ink according to claim 1, wherein the dispersible colorant has a surface functional group density of 250 μmol/g or more and less than 1,000 μmol/g.

3. The aqueous ink according to claim 1, wherein the chargeable resin pseudo fine particle comprises a resin component having a glass transition temperature of −40° C. or more and 60° C. or less.

4. The aqueous ink according to claim 1, wherein the dispersible colorant is made by integrating a chargeable resin pseudo fine particle, which is prepared through aqueous precipitation polymerization of radically polymerizable monomers using an aqueous radical polymerization initiator in an aqueous solution having a water-insoluble colorant dispersed therein, and the water-insoluble colorant.

5. The aqueous ink according to claim 1, wherein the water-soluble nonionic resin has a weight average molecular weight Mw of 2,000 to 10,000.

6. The aqueous ink according to claim 1, comprising 1 mass % or more of the water-soluble nonionic resin.

7. The aqueous ink according to claim 1, wherein the emulsion particle is electrically identical to the chargeable resin pseudo fine particle, or are nonionic.

8. The aqueous ink according to claim 1, wherein the emulsion particle has an average particle diameter of 10 to 80 nm.

9. The aqueous ink according to claim 1, comprising 0.1 mass % or more of the emulsion particle.

10. The aqueous ink according to claim 1, wherein the emulsion particle has a glass transition temperature (Tg) of −40° C. or more and 60° C. or less.

11. The aqueous ink according to claim 1, which is for ink jet recording.

12. An ink tank comprising the aqueous ink as set forth in claim 11.

13. An ink jet recording apparatus for forming an ink jet recorded image by means of the aqueous ink as set forth in claim 11.

14. An ink jet recording method, comprising forming an image with an ink jet recording apparatus using the aqueous ink as set forth in claim 11.

15. An ink jet recorded image formed by an ink jet recording apparatus using the aqueous ink as set forth in claim 11.

* * * * *

UNITED STATES PATENT AND TRADEMARK OFFICE
CERTIFICATE OF CORRECTION

PATENT NO. : 7,291,211 B2
APPLICATION NO. : 11/311641
DATED : November 6, 2007
INVENTOR(S) : Toshiaki Kaneko et al.

It is certified that error appears in the above-identified patent and that said Letters Patent is hereby corrected as shown below:

COLUMN 1
Line 41, "performances" should read --performances:--.

COLUMN 11
Line 9, "les" should read --less--.

COLUMN 12
Line 52, "metahcrylonitrile" should read --methacrylonitrile--.

COLUMN 13
Line 62, "sate" should read --state--.

COLUMN 14
Line 58, "is" should read --are--.

COLUMN 19
Line 33, "decreases" should read --decrease--.

COLUMN 30
Line 8, "200" should read --20°--.

Signed and Sealed this

Sixteenth Day of December, 2008

JON W. DUDAS
*Director of the United States Patent and Trademark Office*